(12) United States Patent
Oulachgar et al.

(10) Patent No.: US 11,054,311 B1
(45) Date of Patent: Jul. 6, 2021

(54) THERMAL RADIATION DETECTORS WITH CARBON-NANOTUBE-BASED OPTICAL ABSORBERS

(71) Applicant: INSTITUT NATIONAL D'OPTIQUE, Quebec (CA)

(72) Inventors: Hassane Oulachgar, Quebec (CA); Francis Genereux, Quebec (CA); Francis Provencal, Quebec (CA)

(73) Assignee: INSTITUT NATIONAL D'OPTIQUE, Quebec (CA)

( * ) Notice: Subject to any disclaimer, the term of this patent is extended or adjusted under 35 U.S.C. 154(b) by 0 days.

(21) Appl. No.: 16/936,899

(22) Filed: Jul. 23, 2020

(51) Int. Cl.
*G01J 5/00* (2006.01)
*G01J 5/02* (2006.01)
*G01J 5/20* (2006.01)
*G01J 5/12* (2006.01)

(52) U.S. Cl.
CPC .............. *G01J 5/0285* (2013.01); *G01J 5/12* (2013.01); *G01J 5/20* (2013.01); *G01J 5/0007* (2013.01)

(58) Field of Classification Search
CPC .... G01J 5/0285; G01J 5/12; G01J 5/20; G01J 5/0007
USPC ..................................................... 250/338.1
See application file for complete search history.

(56) References Cited

U.S. PATENT DOCUMENTS

| | | | |
|---|---|---|---|
| 5,798,684 A * | 8/1998 | Endo | G01J 5/20 29/612 |
| 7,723,684 B1 | 5/2010 | Haddon et al. | |
| 8,604,459 B1 | 12/2013 | Ward et al. | |
| 2011/0108729 A1* | 5/2011 | Oda | H01L 27/14649 250/338.4 |
| 2011/0315981 A1* | 12/2011 | Xu | G01J 5/02 257/43 |
| 2013/0248712 A1* | 9/2013 | Abdolvand | G01J 5/12 250/338.1 |
| 2013/0264542 A1 | 10/2013 | Wu et al. | |

(Continued)

OTHER PUBLICATIONS

Omidvar, H., et al. "A method for coating carbon nanotubes with titanium," New Carbon Materials, vol. 27, Issue 6, Dec. 2012, p. 401-408.

(Continued)

*Primary Examiner* — Kiho Kim
(74) *Attorney, Agent, or Firm* — Brooks Kushman P.C.

(57) ABSTRACT

A thermal radiation detector is disclosed that includes a substrate, a platform suspended above the substrate, a support structure holding the platform, and a temperature sensor disposed on the platform and having an electrical parameter that varies in accordance with the temperature of the temperature sensor. The detector also includes a carbon-nanotube-based optical absorber in thermal contact with the temperature sensor and configured to absorb electromagnetic radiation to generate heat to change the temperature of the temperature sensor. The optical absorber may include a carbon nanotube film, for example, obtained by spray coating. The detector further includes a passivation layer structure disposed over the optical absorber, which may be made of a metal compound, for example, titanium or aluminum oxide. The thermal radiation detector may be a microbolometer detector, a thermocouple/thermopile detector, or a pyroelectric detector. Arrays of thermal radiation detectors and fabrication methods are also disclosed.

19 Claims, 16 Drawing Sheets

(56) References Cited

U.S. PATENT DOCUMENTS

| | | | |
|---|---|---|---|
| 2014/0004666 A1 | 1/2014 | Franklin et al. | |
| 2014/0091217 A1* | 4/2014 | Oulachgar | G01J 5/024 250/338.3 |
| 2014/0105242 A1 | 4/2014 | Fernandes | |
| 2014/0166882 A1* | 6/2014 | Oulachgar | G01J 5/0834 250/338.4 |
| 2014/0267756 A1* | 9/2014 | Gousev | G01J 5/20 348/164 |
| 2014/0326883 A1* | 11/2014 | Abdolvand | G01J 5/16 250/338.1 |
| 2015/0179864 A1* | 6/2015 | Huminic | H01L 31/02 438/54 |
| 2016/0025664 A1* | 1/2016 | Quevy | B81B 7/0077 257/414 |
| 2016/0178444 A1* | 6/2016 | Oulachgar | G01J 3/36 250/349 |
| 2016/0282194 A1* | 9/2016 | Barnett | G01J 5/04 |
| 2018/0156668 A1 | 6/2018 | Bekyarova et al. | |

OTHER PUBLICATIONS

Lin, Albert, et al. "An electrophoretic-deposited low-cost carbon nanotube (CNT) thermophotovoltaic emitter," In 2018 IEEE 7th World Conference on Photovoltaic Energy Conversion (WCPEC)(A Joint Conference of 45th IEEE PVSC, 28th PVSEC & 34th EU PVSEC), Jun. 2018, p. 2905-2908.

Svatos, Vojtech, et al. "In Situ Observation of Carbon Nanotube Layer Growth on Microbolometers with Substrates at Ambient Temperature," Journal of Applied Physics, Mar. 2018, vol. 123, No. 11, p. 1-15.

Nandi, Sukanta and Misra, Abha. "Spray Coating of Two-Dimensional Suspended Film of Vanadium Oxide-Coated Carbon Nanotubes for Fabrication of a Large Volume Infrared Bolometer," ACS Applied Materials & Interfaces, Dec. 2019, vol. 12, No. 1, p. 315-1321.

Martin-Fernandez, I., et al. "Batch wafer scale fabrication of passivated carbon nanotube transistors for electrochemical sensing applications," Journal of Vacuum Science & Technology B, Nanotechnology and Microelectronics: Materials, Processing, Measurement, and Phenomena, Dec. 2010, vol. 28, No. 6, p. C6P1-C6P5.

\* cited by examiner

THERMAL RADIATION DETECTORS WITH CARBON-NANOTUBE-BASED OPTICAL ABSORBERS

TECHNICAL FIELD

The technical field generally relates to thermal radiation detectors and, more particularly, to thermal radiation detectors that include optical absorbers based on carbon nanotubes (CNTs).

BACKGROUND

Thermal radiation detectors are devices that sense changes in an electrical parameter in response to temperature variations related to an amount of absorbed electromagnetic radiation. Common types of thermal radiation detectors include microbolometer detectors, thermocouple/thermopile detectors, and pyroelectric detectors. These detectors can allow for uncooled and spectrally broadband operation in various commercial, industrial, and military applications. Arrays of thermal radiation detectors can be fabricated on a substrate using common integrated-circuit-based microfabrication techniques, such as photolithography and surface micromachining. Detector components may be successively deposited and patterned using thin-film deposition techniques paired with selective photoresist and sacrificial etching processes. The substrate may be pre-manufactured using complementary metal-oxide-semiconductor (CMOS) processes and provided with a readout integrated circuit (ROIC).

Thermal radiation detectors usually include optical absorbers to enhance their sensitivity and overall performance. Various types of materials and structures have been used or studied for use as optical absorbers, among which are porous metal blacks, such as gold black. Porous metal-black films can provide high-efficiency, low-thermal-mass broadband absorbers that can be deposited at low temperatures using chemical vapor deposition processes for use in various applications in the infrared and terahertz spectral ranges. However, their widespread use has been hampered by several limitations, including their fragility, thermal instability, and sensitivity to high-intensity radiation. These limitations can degrade their absorbing properties and make them incompatible or less compatible with wafer-level CMOS microfabrication processes and high-temperature processing and packaging. Carbon-based materials, such as carbon nanotubes (CNTs), have been considered as potential alternatives to metal-black films, owing to their desirable mechanical, thermal, chemical, electrical, and optical properties. However, despite their potential advantages, challenges remain in their use as optical absorbers in microfabricated thermal radiation detectors, for example, related to the control of the porosity, density, uniformity, and selective patterning of CNT films on suspended microstructures.

SUMMARY

The present description generally relates to thermal radiation detectors, such as microbolometer, thermocouple/thermopile, and pyroelectric detectors, with passivated carbon-nanotube-based optical absorbers.

In accordance with an aspect, there is provided a thermal radiation detector including:
 a substrate;
 a platform suspended above the substrate;
 a support structure holding the platform;
 a temperature sensor disposed on the platform and having an electrical parameter that varies in accordance with a temperature of the temperature sensor;
 an optical absorber in thermal contact with the temperature sensor and configured to absorb incoming electromagnetic radiation to generate heat to change the temperature of the temperature sensor, the optical absorber including carbon nanotubes; and
 a passivation layer structure disposed over the optical absorber.

In accordance with another aspect, there is provided a thermal radiation detector array including a plurality of thermal radiation detectors such as described herein.

In accordance with another aspect, there is provided a microbolometer detector including:
 a substrate;
 a platform suspended above the substrate;
 a support structure holding the platform;
 a thermistor disposed on the platform and having an electrical resistance that varies with a temperature of the thermistor;
 an optical absorber in thermal contact with the thermistor and configured to absorb incoming electromagnetic radiation to generate heat to change the temperature of the thermistor; and
 a passivation layer structure disposed over the optical absorber and including titanium oxide.

In accordance with another aspect, there is provided a method of fabricating a thermal radiation detector, including:
 forming a sacrificial layer on a substrate;
 forming a platform and a support structure on the sacrificial layer;
 forming a temperature sensor on the platform, the temperature sensor having an electrical parameter that varies in accordance with a temperature of the temperature sensor;
 forming an optical absorber in thermal contact with the temperature sensor and configured for absorbing incoming electromagnetic radiation to generate heat to change the temperature of the temperature sensor, the optical absorber comprising carbon nanotubes;
 forming a passivation layer structure over the optical absorber; and
 removing the sacrificial layer to suspend the platform above the substrate by the support structure and release the thermal radiation detector.

Other method and process steps may be performed prior to, during or after the method and process steps described herein. The order of one or more of the steps may also differ, and some of the steps may be omitted, repeated, and/or combined, depending on the application or the characteristics of the device to be fabricated.

Other features and advantages of the present description will become more apparent upon reading of the following non-restrictive description of specific embodiments thereof, given by way of example only with reference to the appended drawings. Although specific features described in the above summary and the foregoing detailed description may be described with respect to specific embodiments or aspects, it should be noted that these specific features can be combined with one another, unless stated otherwise.

DETAILED DESCRIPTION

Figure 1:
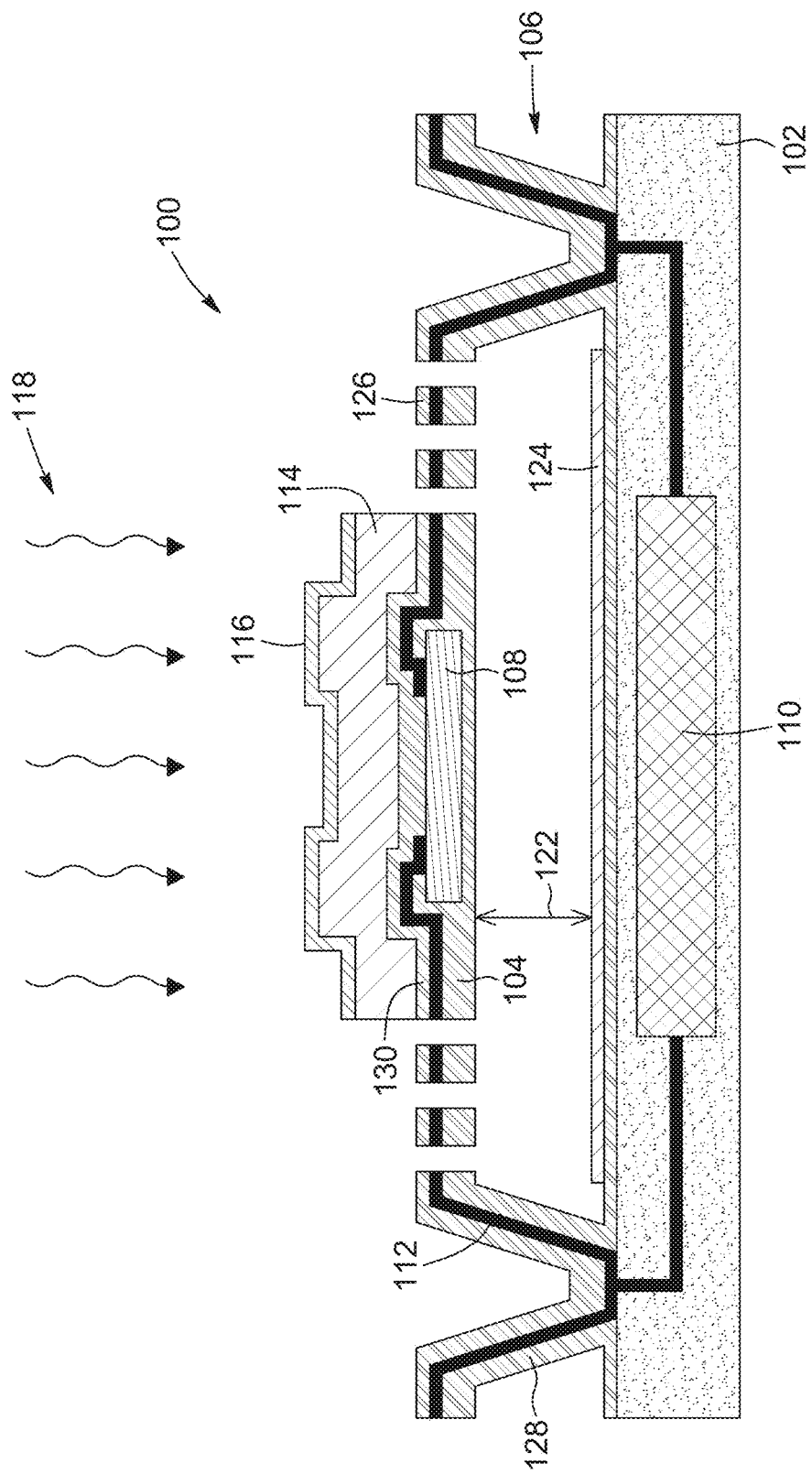
FIG. 1 is a schematic cross-sectional elevation view of a thermal radiation detector in accordance with an embodiment, where the thermal radiation detector is a microbolometer detector.

In the present description, similar features in the drawings have been given similar reference numerals. To avoid cluttering certain figures, some elements may not be indicated if they were already identified in a preceding figure. It should also be understood that the elements of the drawings are not necessarily depicted to scale, since emphasis is placed on clearly illustrating the elements and structures of the present embodiments. Furthermore, positional descriptors indicating the location and/or orientation of one element with respect to another element are used herein for ease and clarity of description. Unless otherwise indicated, these positional descriptors should be taken in the context of the figures and should not be considered limiting. As can be appreciated, such spatially relative terms are intended to encompass different orientations in the use or operation of the present embodiments, in addition to the orientations exemplified in the figures. Furthermore, when a first element is referred to as being "on", "above", "below", "over", or "under" a second element, the first element can be either directly or indirectly on, above, below, over, or under the second element, respectively, such that one or multiple intervening elements may be disposed between the first element and the second element.

The terms "a", "an", and "one" are defined herein to mean "at least one", that is, these terms do not exclude a plural number of elements, unless stated otherwise.

Terms such as "substantially", "generally", and "about", that modify a value, condition, or characteristic of a feature of an exemplary embodiment, should be understood to mean that the value, condition, or characteristic is defined within tolerances that are acceptable for the proper operation of this exemplary embodiment for its intended application or that fall within an acceptable range of experimental error. In particular, the term "about" generally refers to a range of numbers that one skilled in the art would consider equivalent to the stated value (e.g., having the same or equivalent function or result). In some instances, the term "about" means a variation of ±10 of the stated value. It is noted that all numerical values used herein are assumed to be modified by the term "about", unless stated otherwise.

The terms "connected" and "coupled", and derivatives and variants thereof, are intended to refer herein to any connection or coupling, either direct or indirect, between two or more elements, unless stated otherwise. For example, the connection or coupling between the elements may be mechanical, optical, electrical, magnetic, thermal, chemical, logical, fluidic, operational, or any combination thereof.

The terms "light" and "optical", and variants and derivatives thereof, are intended to refer herein to radiation in any appropriate region of the electromagnetic spectrum. These terms are not limited to visible light, but may also include, without being limited to, the infrared, terahertz and millimeter wave regions. By way of example, in some embodiments, the present techniques may be used with electromagnetic radiation having a center wavelength ranging from about 0.2 μm to about 3000 μm. Infrared radiation is commonly divided into various regions, including the near-infrared (NIR) region for wavelengths ranging from 0.7 to 1.4 µm; the short-wavelength infrared (SWIR) region for wavelengths ranging from 1.4 to 3 µm; the mid-wavelength infrared (MWIR) region for wavelengths ranging from 3 to 8 µm; the long-wavelength infrared (LWIR) region for wavelengths ranging from 8 to 15 µm; and the far-infrared (FIR) region for wavelengths ranging from 15 to 1000 µm. It is appreciated that the definitions of different infrared regions in terms of spectral ranges, as well as their limits, may vary depending on the technical field under consideration, and are not meant to limit the scope of application of the present techniques. It is also appreciated that although several embodiments of the present techniques may be useful in infrared applications, other embodiments could additionally or alternatively operate in other regions of the electromagnetic spectrum, for example, in the terahertz region.

The present description generally relates to thermal radiation detectors with passivated carbon-nanotube-based optical absorbers. As described in greater detail below, a thermal radiation detector in accordance with an embodiment may include a substrate, a platform suspended above the substrate by a support structure, a temperature sensor disposed on the platform, an optical absorber including CNTs and configured to absorb electromagnetic radiation to heat up the temperature sensor, and a passivation layer structure formed on the optical absorber.

The provision of a passivation layer structure may protect or help protect the integrity of the optical absorber during the release of the suspended platform. The platform release process typically includes a step of etching a sacrificial layer on which the platform is formed. Sacrificial layer etching is often performed in an oxygen-rich environment, for example, in an oxygen plasma, which could otherwise damage or adversely affect the CNTs forming the optical absorber without the provision of a passivation layer structure. In one embodiment, the CNTs may be formed as a film (e.g., by spray coating) and the passivation layer structure may be formed on the CNT film by deposition of a metal layer (e.g., by sputtering) followed by an oxidation process (e.g., by oxygen plasma treatment) to convert the metal layer to a metal oxide layer. For example, the metal layer may be made of titanium (Ti) or aluminum (Al) and the metal oxide layer may be made of titanium oxide (e.g., titanium dioxide, TiO2) or aluminum oxide (e.g., alumina, Al2O3). Alternatively, the passivation layer structure may be formed on the CNT film by deposition of a metal oxide layer, for example, a titanium oxide or aluminum oxide layer, optionally followed by an oxidation process. Depending on the desired or required thickness for the optical absorber, a multilayer stack of alternating layers of CNTs and passivation layers may be formed through a series of deposition, photolithography, and etching steps to enhance or otherwise control the absorption spectrum and the passivation properties of the stack.

The term "thermal radiation detector" generally refers herein to a detector of electromagnetic radiation that includes an optical absorber and a temperature sensor or transducer. The optical absorber is configured to absorb the radiation and convert the absorbed radiation into heat. The temperature sensor is in thermal contact with the optical absorber and has an electrical parameter that varies in accordance with its temperature. When heated by the optical absorber, the temperature of the temperature sensor increases. This produces a change in the electrical parameter, which can then be measured electrically. Several types of thermal radiation detectors exist, which may be categorized according to the nature and operating principles of the temperature sensor. Non-limiting examples of thermal radiation detectors include microbolometer detectors, which include thermistors operating based on the thermoresistive effect, thermocouple/thermopile detectors, which include one or more thermocouples operating based on the Seebeck effect, pyroelectric detectors, which operate based on the pyroelectric effect, and piezoelectric temperature detectors, which operate based on the piezoelectric effect. It is appreciated that the theory, structure, operation, and applications of such thermal radiation detectors are generally known in the art, and need not be described in detail herein other than to facilitate an understanding of the present techniques. It is also appreciated that the use of the term "thermal" refers to the fact that the operation of the thermal radiation detectors disclosed herein involves the conversion of electromagnetic radiation into heat. In particular, the term "thermal" does not mean that the thermal radiation detectors disclosed herein are limited to detecting "thermal radiation", which is a term whose scope is sometimes limited to infrared radiation. Rather, the thermal radiation detectors disclosed herein may be configured to detect electromagnetic radiation in any appropriate region of the spectrum.

The present techniques have potential use in various commercial, industrial, and military applications that may benefit from or require thermal radiation detectors with enhanced optical absorbers. Non-limiting examples of possible fields of use include, to name a few, defense and security, aerospace and astronomy, inspection and maintenance, night vision, transportation, pollution and fire detection, spectroscopy, remote sensing, industrial control, robotics, medicine, sports and entertainment, food supply chain management, and the Internet of Things.

Various aspects, features, and implementations of the present techniques are described below with reference to the figures.

Referring to FIG. 1, there is illustrated a schematic view of a possible embodiment of a thermal radiation detector 100. In this embodiment, the thermal radiation detector 100 is implemented as a microbolometer detector. The thermal radiation detector 100 of FIG. 1 may be used as an individual pixel (photosensitive element) of a microbolometer array of a thermal camera or imaging device. In the present description, the term "microbolometer" is intended to refer to a thermal radiation detector whose temperature sensor is a thermistor, which is a piece of material whose electrical resistance changes in response to temperature variations caused by the heat generated by the absorbed radiation. Microbolometers can be classified as either cooled or uncooled, depending on whether their operation involves cooling or not. It is also appreciated that, in the present description, the terms "microbolometer" and "bolometer" can generally be used interchangeably.

The thermal radiation detector 100 of FIG. 1 is formed as a stack of layers deposited on a substrate 102. The thermal radiation detector 100 generally includes a substrate 102, a suspended platform 104, a support structure 106 configured to hold the platform 104 above the substrate 102, a temperature sensor or transducer 108 disposed on the platform 104, an electrical readout circuit 110 located in the substrate, an electrode structure 112 electrically connecting the temperature sensor 108 to the electrical readout circuit 110, an optical absorber 114 in thermal contact with the temperature sensor, and a passivation layer structure 116 disposed over the optical absorber 114. The structure, composition, and operation of these and other possible components of the thermal radiation detector 100 are described in greater detail below.

Thermal radiation detectors such as the one depicted in FIG. 1 may be fabricated using common integrated-circuit and microfabrication techniques, such as surface and bulk micromachining. In such techniques, detector components can be successively deposited and patterned on a substrate using thin-film deposition techniques paired with selective photoresist and sacrificial layer etching processes. In some applications, thermal radiation detectors can be fabricated using a monolithic integration approach in which the substrate, typically provided with an underlying readout integrated circuit (ROIC), is pre-manufactured using complementary metal-oxide-semiconductor (CMOS) processes. It is appreciated that various other fabrication techniques may be used, including those based on silicon-on-insulator, GaAs, GaN, InP, and SiC techniques.

Figure 2A:
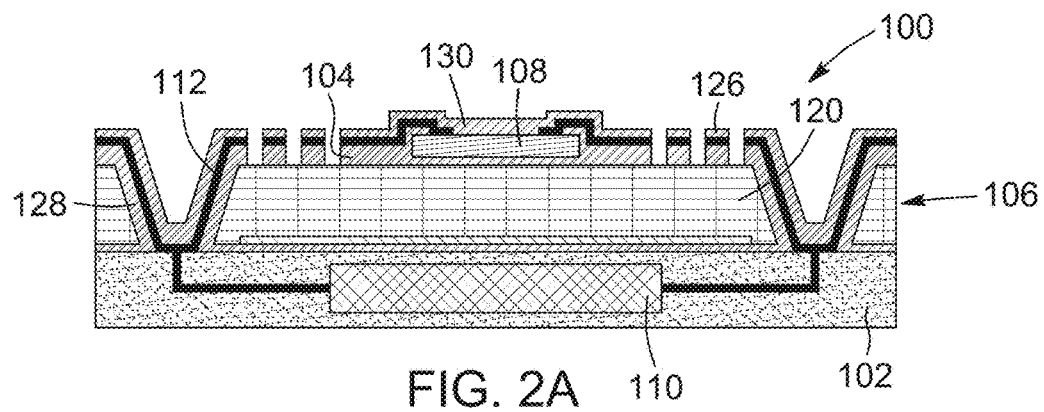
FIGS. 2A to 2D illustrate steps of a process for fabricating the thermal radiation detector of FIG. 1.
Figure 2B:
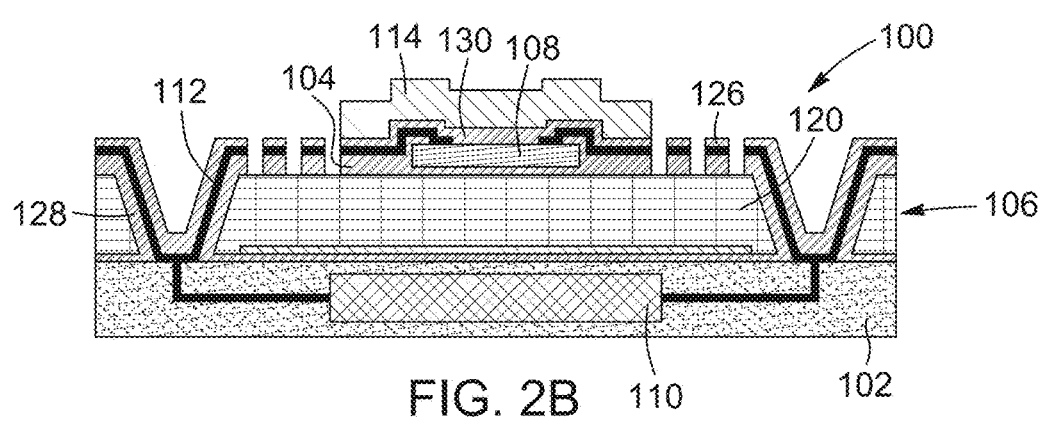
Figure 2C:
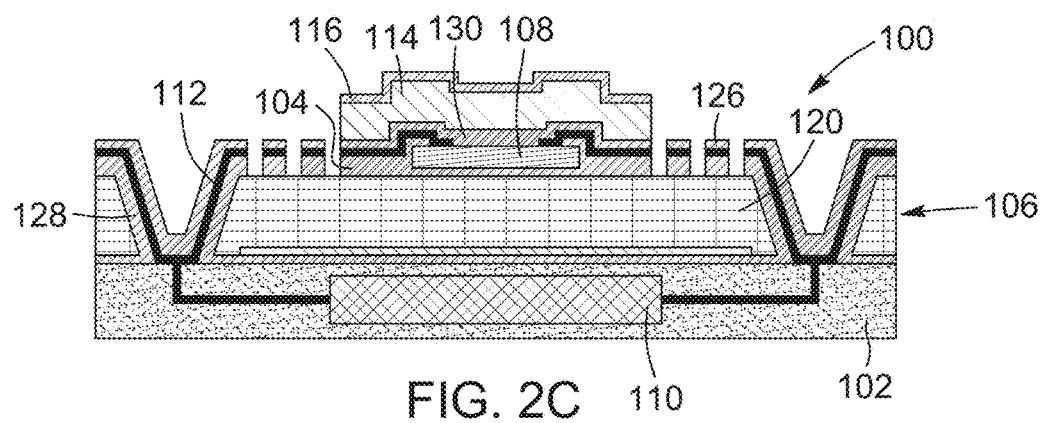
Figure 2D:
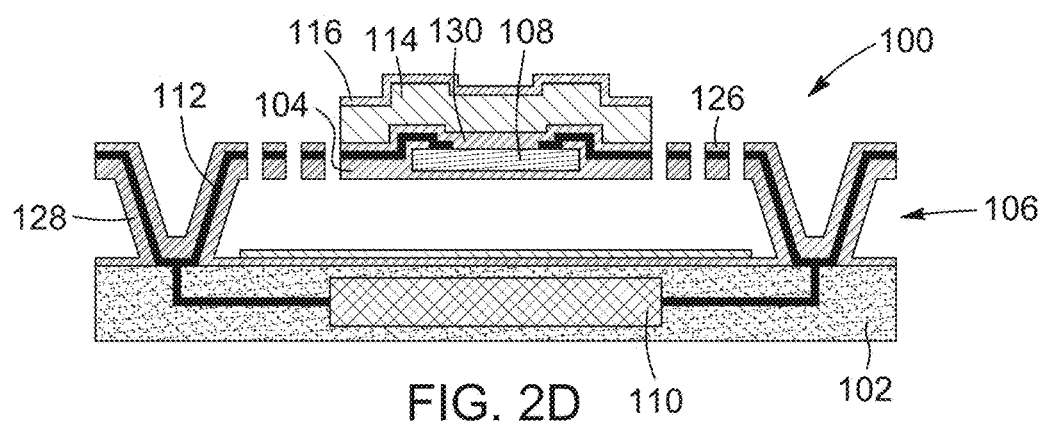

FIGS. 2A to 2D illustrate possible steps of a method of fabricating a thermal radiation detector 100, such as the one of FIG. 1. The method may include a step of forming a sacrificial layer 120 on a substrate 102, followed by subsequent steps of forming a platform 104 and a support structure 106 on the sacrificial layer 120 and forming a temperature sensor 108 on the platform 104, the temperature sensor 108 having a electrical parameter that varies in accordance with its temperature (see FIG. 2A). It is appreciated that the steps of forming the sacrificial layer 120, the platform 104, the support structure 106, and the temperature sensor 108 may each include a series of deposition, photolithography pattern, and etching operations. The method may also include a step of forming an optical absorber 114 including carbon nanotubes and disposed in thermal contact with the temperature sensor 108 (see FIG. 2B). As noted above, the optical absorber 114 is configured for absorbing incoming electromagnetic radiation to heat up the temperature sensor 108 and change its electrical response. The method may further include a step of forming a passivation layer structure 116 over the optical absorber 114 (see FIG. 2C). The method may also include a step of removing the sacrificial layer 120 to suspend the platform 104 above the substrate 102 by the support structure 106 and release the thermal radiation detector 100 (FIG. 2D).

Returning to FIG. 1, the substrate 102 provides mechanical support for the other components of the thermal radiation detector 100. The substrate 102 may be made of silicon (Si), silicon carbide (SiC), gallium arsenide (GaAs), gallium nitride (GaN), germanium (Ge), or another suitable material or combination of materials. For example, the substrate 102 may be a die separated from a semiconductor wafer, for example, a silicon wafer. In some implementations, the substrate 102, as well as other components of the thermal radiation detector 100 may be made of a flexible material, for example, a polymer material, such as disclosed in co-assigned U.S. Pat. Appl. Pub. No. 2020/0149973 A1, the disclosure of which is incorporated herein by reference in its entirety. The electrical readout circuit 110 may be embodied by one or more CMOS circuitry layers formed in or on the substrate 102. The electrical readout circuit 110 may alternatively be provided outside of the substrate 102. The electrical readout circuit 110 may be configured to measure changes in an electrical parameter of the temperature sensor 108 (e.g., its electrical resistance when the temperature sensor 108 is a thermistor) in response to temperature variations thereof caused by heat generated from electromagnetic radiation 118 absorbed by the optical absorber 114.

The platform 104 is suspended above the substrate 102 by the support structure 106. The term "platform" generally refers herein to a substantially planar, suspended structure, typically having greater horizontal dimensions than vertical thickness. In the present description, the term "horizontal" refers to directions lying in a plane generally parallel to the substrate 102, while the term "vertical" refers to a direction generally perpendicular to the plane of the substrate 102. The suspension of the platform 104 above the substrate 102 provides thermal isolation to the temperature sensor 108, in order to enhance the detection sensitivity of the thermal radiation detector 100. The platform 104 may be a single or multilayer structure made of an electrically insulating, mechanically self-supportive and low-stress material, such as silicon nitride, silicon dioxide, silicon oxynitride, a metal or metal oxide. The platform 104 may have horizontal dimensions ranging from about 5 μm to about 25 millimeters (mm), and a thickness ranging from about 0.05 μm to about 1 mm, although other dimensions may be used in other implementations. It is appreciated that the platform 104 may be provided in a variety of sizes, shapes, and configurations.

In the illustrated embodiment, the platform 104 is printed on top of a sacrificial layer 120 (see FIG. 2A). The sacrificial layer 120 may be formed on the substrate 102 during the fabrication process of the thermal radiation detector 100 and be subsequently etched, dissolved, or otherwise removed to define a gap 122 between the substrate 102 and the platform 104 (see FIG. 2D). The sacrificial layer 120 may be made of polyimide or another suitable material, for example, photoresist material and other organic materials that can be etched in plasma etching process. The sacrificial layer 120 may be removed using an oxygen plasma release process or another suitable release process, for example, a wet or dry etching process. Furthermore, a reflector 124 may be deposited on the substrate 102 under the platform 104. The reflector 124 may include a thin metal film, for example, a thin aluminum, gold, or silver film, which can form an optical resonant cavity with the platform 104 to enhance the optical absorption capabilities of the thermal radiation detector 100.

Referring still to FIG. 1, the platform 104 is held above the substrate 102 by the support structure 106. In the present description, the term "support structure" is used to refer broadly to a structure configured to hold the platform 104 in a spaced-apart relationship above the substrate 102. For example, the support structure 106 may be configured to hold the platform 104 at a height ranging from about 1 μm to about 5 mm above the substrate 102, although other height values are possible in other implementations. The support structure 106 also provides a path for the electrode structure 112 to connect the temperature sensor 108 to the electrical readout circuit 110. Like the platform 104, the support structure 106 may be made of a low-stress and self-supporting material such as silicon nitride or silicon dioxide. In some embodiments, it may be convenient to describe the support structure 106 as having arms 126 and posts 128. The terms "arm" and "post" generally refer herein to structural elements of the support structure 106 that extend mainly horizontally and mainly vertically, respectively. In FIG. 1, the support structure 106 includes arms 126 that extend outwardly from opposite edges of the platform 104, and posts 128 connecting the arms 126 to the substrate 102. It is appreciated, however, that the support structure 106 may have a variety of configurations to meet the mechanical, electrical, and/or thermal requirements or preferences of a given application. In particular, the arms 126 and posts 128 of the support structure 106 may have various sizes, shapes, and arrangements relative to the platform 104, and their number can vary depending on the application.

The temperature sensor 108 is disposed on the platform 104 and has an electrical parameter responsive to variations in its temperature resulting from the heat produced by the absorption of the electromagnetic radiation 118 by the optical absorber 114. The variations in the electrical parameter of the temperature sensor 108 can be measured by the electrical readout circuit 110. In the embodiment of FIG. 1, the temperature sensor 108 includes a thermistor deposited on the platform 104 and the temperature-sensitive electrical parameter is the electrical resistance of the thermistor. In the present description, the term "thermistor" is intended to encompass any suitable material, structure, or device having an electrical resistance that changes as a function of its temperature, generally in a predictable and controllable manner. The thermistor may be made of a material having a high temperature coefficient of resistance (TCR) at room temperature, for example, at least 0.5% per kelvin in absolute value. Non-limiting examples of thermistor materials include, to name a few, vanadium oxide, amorphous silicon, and titanium oxide. However, other thermistor materials or combinations of thermistor materials may be used in other implementations including, but not limited to, semiconductor-, ceramic-, polymer-, and metal-based thermistors, with either positive or negative TCRs. Although a single thermistor is illustrated in FIG. 1, a plurality of thermistors may be provided in other embodiments. It is appreciated that the size, shape, and arrangement of the or each thermistor may be varied depending on the application.

The electrode structure 112 extends along the platform 104, the arms 126, the posts 128, and the substrate 102 to provide an electrically conductive path between the temperature sensor 108 and the electrical readout circuit 110. The electrode structure 112 may be formed using common microfabrication techniques and may be made from any suitable electrically conducting material including, to name a few, gold, aluminum, titanium, copper, silver, tungsten, chrome, and vanadium. It is appreciated that the size, shape, composition, and configuration of the electrode structure 112 may be varied in accordance with the requirements or preferences of a given application.

Referring still to FIG. 1, the optical absorber 114 is provided in thermal contact with the temperature sensor 108 and is configured to absorb the incoming electromagnetic radiation 118 to generate heat to increase the temperature of the temperature sensor 108. In the present description, the term "optical absorber" refers to a material or structure of the thermal radiation detector which, upon exposure to electromagnetic radiation within a certain waveband, absorbs electromagnetic energy from the electromagnetic radiation within that waveband and convert the absorbed electromagnetic energy into thermal energy. In the illustrated embodiment, the optical absorber 114 is made of an absorber material that includes carbon nanotubes, as described in greater detail below.

In the present description, the term "thermal contact" generally means that heat conduction occurs directly or indirectly between two elements, that is, the two elements may be in direct contact with each other or may have a sufficiently thermally conducting material present between them. Specifically, the term "thermal contact" is intended to refer to the fact that when the optical absorber 114 is heated upon absorption of electromagnetic radiation 118, the heat thus generated is conducted, radiated or otherwise transmitted to the temperature sensor 108. In the embodiment of FIG. 1, the optical absorber 114 is disposed on the platform 104 and over the temperature sensor 108. Depending on the application, the optical absorber 114 may be either in direct contact with the temperature sensor 108 or, as depicted in FIG. 1, separated from the temperature sensor 108 by one or more intervening layers 130, for example, made of silicon nitride or silicon dioxide.

Figure 3:
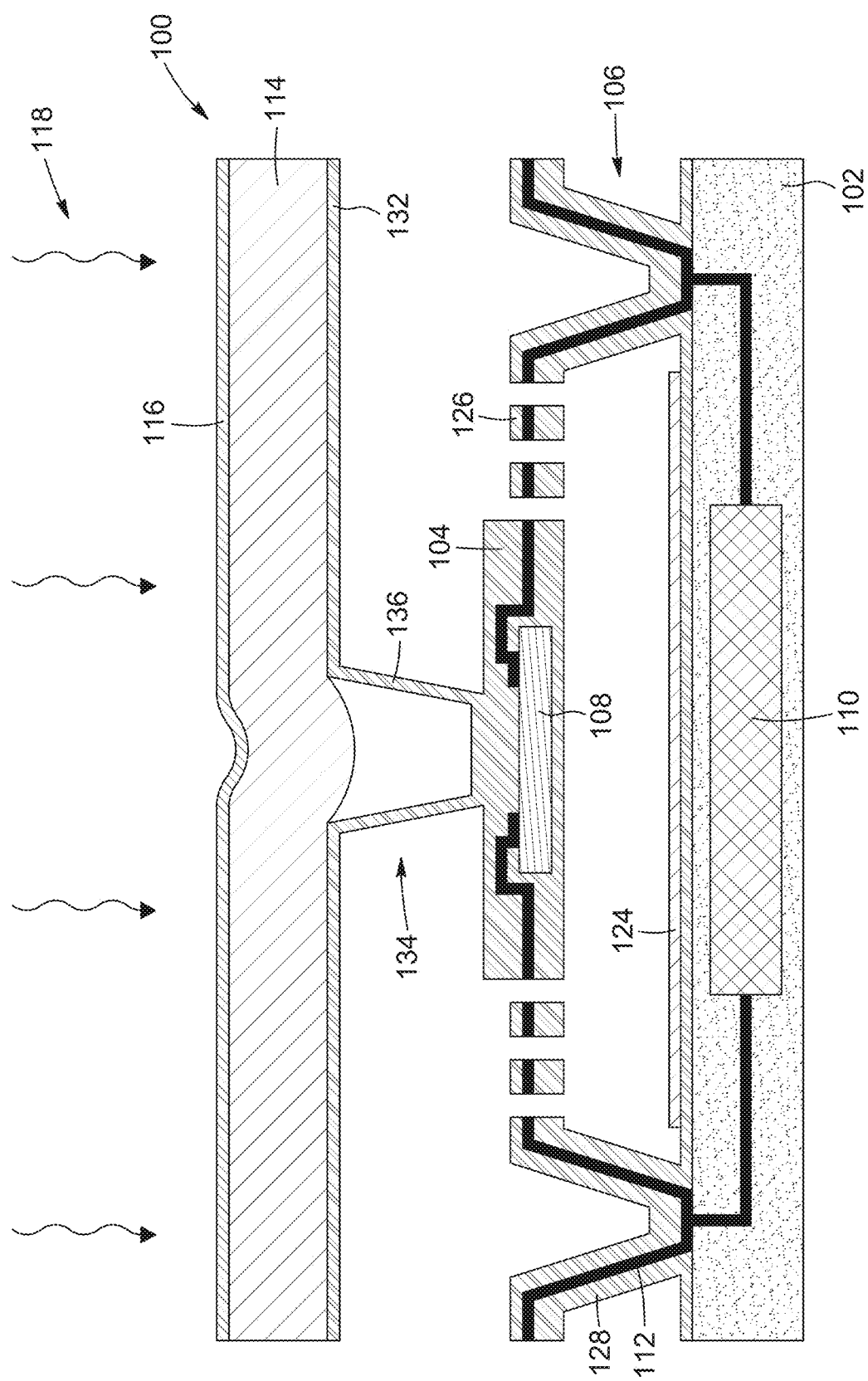
FIG. 3 is a schematic cross-sectional elevation view of a thermal radiation detector in accordance with another embodiment, where the thermal radiation detector is a microbolometer detector having a double-platform structure.

Referring to FIG. 3, there is illustrated another embodiment of a thermal radiation detector 100, which is also implemented as a microbolometer detector. The embodiment of FIG. 3 shares several features with the embodiment of FIG. 1, which will not be described again other than to highlight differences between them. The thermal radiation detector 100 generally includes a substrate 102, a platform 104, a support structure 106, a temperature sensor 108, an electrical readout circuit 110, an electrode structure 112, an optical absorber 114, and a passivation layer structure 116, several of which may be similar to those of FIG. 1. In FIG. 3, the thermal radiation detector 100 further includes an absorber platform 132 suspended above the platform 104 in a spaced relationship therewith. The optical absorber 114, which is composed of carbon nanotubes, is disposed on the absorber platform 132. The thermal radiation detector 100 of FIG. 3 also further includes another support structure 134 configured to hold the absorber platform 132. For example, the absorber platform support structure 134 may be configured to hold the absorber platform 132 at a height ranging from about 1 µm to about 25 µm above the platform 104, although other height values are possible in other implementations. The absorber platform 132 and its support structure 134 may be made of a mechanically self-supportive material, for example, silicon nitride, silicon dioxide, or a metal.

The absorber platform 132 and the support structure 134 provide a thermal conductance path between the optical absorber 114 on the absorber platform 132 and the temperature sensor 108 so that the heat generated by the optical absorber 114 upon absorption of electromagnetic radiation 118 can be transferred to the temperature sensor 108. The thermal conductance of the absorber platform 132 and its support structure 134 can be adjusted based on the thermal requirements of a given application. In the illustrated embodiment, the support structure 134 includes a post 136 projecting upwardly from a central region of the platform 104. The configuration and disposition of the support structure 134 can be varied in other embodiments, depending on the requirements or preferences of a given application. It is appreciated that compared to a single-platform structure such as the one depicted in FIG. 1, the provision of a double-platform structure such as the one depicted in FIG. 3 may improve the thermal insulation of the temperature sensor 108, provide a higher fill factor for optical absorption, and/or shield the support structure 106 during the fabrication of the optical absorber 114 and the passivation layer structure 116.

Returning to FIG. 1, the optical absorber 114 includes a CNT film. CNTs have desirable mechanical, thermal, chemical, electrical, and optical properties, which make them interesting for a broad range of applications. CNTs are known as efficient broadband optical absorbers, notably in the visible, infrared, and terahertz regions of the electromagnetic spectrum. The absorption spectrum of optical absorbers made of CNT-based films depend on a number of factors including, for example, the thickness of the CNT film and the diameter and length of the individual CNTs.

In the present description, the term "carbon nanotube" (CNT) generally refers to a hollow article composed primarily of carbon atoms. CNTs are typically formed from cylindrical layers of graphene sheets. The individual sheets can vary in layering, morphology, and functionality. CNTs can exist as single-walled CNTs (SWCNTs) and multiwalled CNTs (MWCNTs). It is appreciated that the present techniques are not limited to specific types of CNTs. As such, the optical absorber 114 can include any mixture of CNTs, where the individual CNTs in the mixture may differ in diameter, chirality, number of walls, and/or any other relevant parameters. CNTs can be metallic, semi-metallic, semi-conducting, or insulating. CNTs can also be chiral or achiral. CNTs can be characterized by a diameter and a length. The diameter may range from about 0.5 nm to about 100 nm and the length may range from about 1 µm to about 50 CNTs are composed primarily of carbon atoms, but they may be doped with other elements, for example, metals. CNTs may be synthesized by a variety of methods including, for example, chemical vapor deposition (CVD), arc discharge, and laser ablation.

In FIG. 1, the optical absorber 114 includes a CNT film deposited on the platform 104. In the present description, the term "CNT film" may refer to any layered arrangement of CNTs, including a network, an array, a mesh, a grid, or a similar arrangement formed of individual CNTs or bundles of CNTs. Individual CNTs of a CNT film may or may not have identical or similar properties. It is appreciated that bundles of CNTs may tend to form spontaneously during fabrication of CNT films. In some implementations, the CNTs or CNT bundles may be randomly arranged within the CNT film. However, in other implementations, the CNTs or CNT bundles may be arranged or aligned along one or more predominant directions. In some implementations, the CNTs may be horizontally stacked or vertically stacked. Depending on the application, the distribution of CNTs or CNT bundles in a CNT film may be homogenous or inhomogeneous. The thickness of the CNT film forming the optical absorber 114 may range from about 0.2 µm to about 500 µm, although other thickness values may be used in other embodiments. CNT films can be prepared using various techniques. These techniques may be divided into two main categories: vapor phase deposition methods and solution-based coating methods. Vapor phase deposition methods include a variety of CVD techniques using mixtures of gas precursors in vacuum-based deposition systems. These growth methods usually involve high processing temperatures and can provide high-quality films with vertically aligned SWCNTs and/or MWCNTs with predefined properties. Solution-based coating methods encompass a variety of techniques including, but not limited to, spray coating, roll-to-roll coating, dip coating, spin coating, spray deposition, inkjet printing, transfer printing, screen printing, sol-gel, vacuum filtration, and electrophoretic deposition. Solution-based coating methods typically use CNT-based dispersions. Such dispersions are generally prepared using a mixture of purified CNT powder, obtained, for example, by CVD, and a wide variety of solvents and surfactants. The solvents and surfactants used can depend on various CNT parameters including, to name a few, the chirality, the functionalization radicals, the coating method, and the properties of the surface or substrate to be coated.

Referring still to FIG. 1, the thermal radiation detector 100 includes a passivation layer structure 116 disposed over the optical absorber 114. In the present description, the term "layer" is intended to refer broadly to any substantially planar or laminar structure (e.g., the passivation layer structure) which is disposed on an underlying structure (e.g., the optical absorber) in a continuous or non-continuous manner. The term "layer" is meant to include both a single layer of particles and multiple layers of particles and is intended to encompass, but is not limited to, films and coatings. Depending on the application, the thickness of the layer may vary or remain substantially uniform over the extent of the layer. The arrangement of the particles forming the layer may be porous or compact and may be homogenous or not. In some implementations, the layer (e.g., the passivation layer structure) can intermingle or mix to some degree with the underlying structure (e.g., the optical absorber) if the underlying structure is sufficiently porous. For example, in some cases, the degree of intermingling between the passivation layer structure and the optical absorber may be sufficiently high for them to be considered to form a composite structure.

The passivation layer structure 116 is configured for allowing the electromagnetic radiation 118 to pass therethrough to reach and be absorbed by the CNTs of the optical absorber 114. In the present description, the terms "transparent" and "transparency", and variants and derivatives thereof, refer to the capability of the passivation layer structure of allowing electromagnetic radiation in a certain spectral region to pass therethrough and reach the optical absorber without being appreciably reflected or absorbed. It is understood that the term "transparent" includes not only "completely transparent", but also "substantially transparent" and "sufficiently transparent". In particular, the term "transparent" in the context of an exemplary embodiment should be interpreted as indicating a degree of transparency that is sufficiently high for the proper operation of the optical absorber of this exemplary embodiment. It is appreciated that the precise degree of transparency of the passivation layer structure may depend on a variety of factors, non-limiting examples of which can include its composition, its thickness, its structure, its fabrication process, and the wavelength or waveband of the radiation that is being transmitted. For example, in one embodiment, the passivation layer structure may be substantially transparent to electromagnetic radiation having a wavelength ranging from about 0.2 µm to about 30 µm, and particularly between about 2 µm and about 14 µm.

The passivation layer structure 116 is also configured for providing a protective barrier for the CNTs, for example, during the process of releasing the platform 104. Platform release may include the etching or otherwise removal of a sacrificial layer on which the platform 104 was formed (see, e.g., FIGS. 2A to 2D). In common micromachining processes, organic sacrificial layer removal may be achieved by oxygen plasma etching or another removal process performed in an oxygen-rich environment or in another environment. It has been recognized by the inventors that oxygen and other oxygen species present in these processes may react with the carbon atoms of the CNTs of the optical absorber 114, for example, to form carbon dioxide, which may degrade or otherwise adversely affect the CNTs if the CNTs are not passivated or otherwise protected. Furthermore, it is noted that passivating CNTs can be challenging. One reason is that CNT films are generally porous and characterized by a non-uniform morphology, which can make the use of conventional passivation methods, such as those using CVD of silicon oxide and silicon nitride films, difficult, impractical, or impossible.

In one embodiment, the passivation layer structure 116 may be a thin-film coating formed on the optical absorber 114. The passivation layer structure 116 may have a thickness sufficient to impart passivation to the optical absorber 114 without or with only little degradation in optical absorption performance. For example, the thickness of the thin-film coating can range from about 50 nm to about 200 nm. In general, the thickness of the passivation layer structure 116 may be adjusted to ensure or help ensure passivation efficiency, optical transparency in the operating waveband, and mechanical integrity. Depending on the application, the thin-film coating forming the passivation layer structure 116 can include a single-layer thin film or a multilayer thin film.

It is appreciated that various types of passivating materials may be used to form the passivation layer structure 116. Non-limiting examples include metal compounds, such as metal oxides, metal nitrides, metal carbides, metal borides, and mixtures and combinations thereof. Depending on the application, the metal compounds may include stoichiometric compounds, non-stoichiometric compounds, or mixtures or stoichiometric and non-stoichiometric compounds. More specific examples of possible materials for the passivation layer structure 116 include titanium oxide, TixOy, (e.g., titanium dioxide, TiO2) and aluminum oxide, AlxOy, (e.g., alumina, Al2O3). It has been found that the use of titanium oxide as a passivating material for CNT-based optical absorbers can be advantageous because titanium oxide has a high chemical resistance to various etching gases and solutions and is widely used in microfabrication processes. Thin films and coatings of titanium and titanium oxide may be deposited by various methods, for example, by sputtering and chemical vapor deposition. In particular, the sputtering of titanium on sufficiently porous CNT films can produce uniform coatings.

It is appreciated that the choice of a suitable passivating material may be made based on a number of factors, non-limiting examples of which include cost, availability of materials and deposition techniques, mechanical, thermal, and chemical stability, and compatibility with the CNTs forming the optical absorber 114. It is also appreciated that the passivation layer structure 116 may be deposited on the optical absorber 114 using a variety of deposition techniques, including physical deposition techniques (e.g., sputtering, thermal evaporation, and electron beam physical vapor deposition), chemical deposition techniques (e.g., plasma-enhanced CVD and low-pressure CVD), or any other appropriate deposition techniques or combination of deposition techniques.

In some implementations, the optical absorber 114 may be formed as a CNT film, for example, by spray coating, and the passivation layer structure 116 may be formed on the CNT film by deposition of a metal layer. In one embodiment, the metal layer may be deposited by sputtering, for example, by ion-beam sputtering. The deposition of the metal layer may be followed by an oxidation process to convert the metal layer into a metal oxide layer. In one embodiment, the oxidation process may be an oxygen plasma treatment, although other oxidation processes may be used, for example, by immersion in an oxidizing solution. For example, the metal layer may be made of titanium (Ti) or aluminum (Al) and the metal oxide layer may be made of titanium oxide (e.g., titanium dioxide, TiO2) or aluminum oxide (e.g., alumina, Al2O3).

In other implementations, the passivation layer structure 116 may be formed by direct deposition of a metal oxide layer on the CNT-film-based optical absorber 114, for example, by sputtering or CVD. In one embodiment, the metal oxide layer may be made of titanium oxide (e.g., titanium dioxide, TiO2) or aluminum oxide (e.g., alumina, Al2O3). In such implementations, the deposition of the metal oxide layer generally need not be followed by post-oxidation processing.

In some implementations, the passivation layer structure 116 may be formed on the optical absorber 114 after the optical absorber 114 has been sputtered or otherwise deposited on the platform 104 (see, e.g., FIGS. 1 and 2C) or the absorber platform 132 (see, e.g., FIG. 3). In other implementations, the passivation layer structure 116 may be formed on the optical absorber 114 to form a passivated CNT-based absorbing structure, which may then be deposited or otherwise transferred on the platform 104 or the absorber platform 132.

Figure 4:
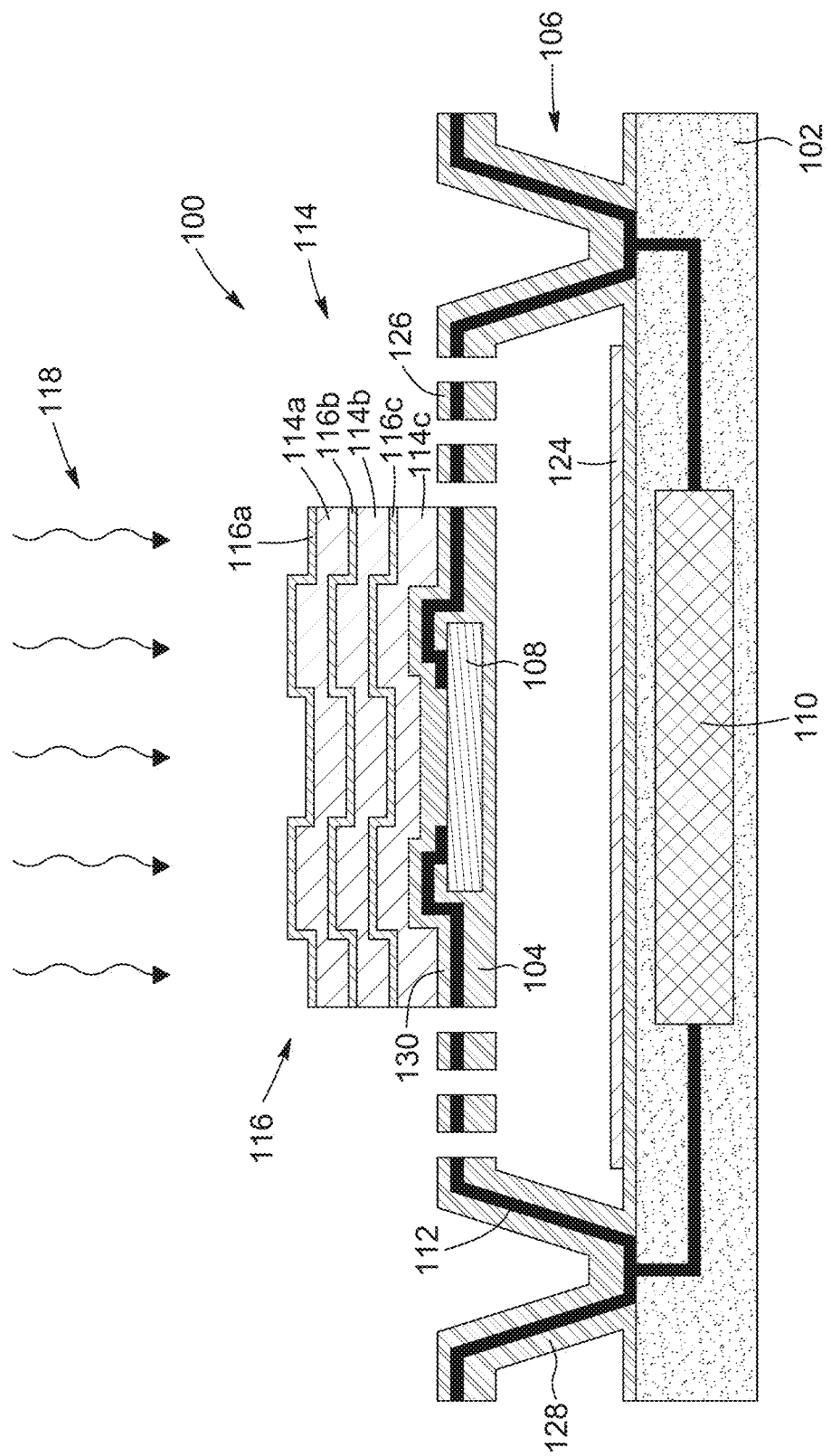
FIG. 4 is a schematic cross-sectional elevation view of a thermal radiation detector in accordance with another embodiment, where the thermal radiation detector is a microbolometer detector having a stack of alternating optical absorber layers and passivation layers.

Referring to FIG. 4, there is illustrated another embodiment of a thermal radiation detector 100 implemented as a microbolometer detector. The embodiment of FIG. 4 shares several features with the embodiment of FIG. 1, which will not be described again other than to highlight differences between them. The thermal radiation detector 100 generally includes a substrate 102, a platform 104, a support structure 106, a temperature sensor 108, an electrical readout circuit 110, an electrode structure 112, an optical absorber 114, and a passivation layer structure 116, several of which may be similar to those of FIG. 1. However, in contrast to the embodiment of FIG. 1, where the optical absorber 114 and the passivation layer structure 116 both have a single-layer configuration, in the embodiment of FIG. 4, the optical absorber 114 includes a plurality of optical absorber layers 114a-114c and the passivation layer structure 116 includes a corresponding plurality of passivation layers 116a-116c. Each one of the passivation layer 116a-116c is disposed over a respective one of the optical absorber layers 114a-114c, so that the plurality of optical absorber layers 114a-114c and the plurality of passivation layers 116a-116c are in a stacked and interleaved arrangement with one another.

Such an arrangement may be desirable or required in certain applications. For example, when the desired or required optical absorber thickness exceeds a certain thickness value, using a stack of optical absorber layers 114a-114c interleaved with passivation layers 116a-116c, where the sum of the thicknesses of the optical absorber layers 114a-114c matches the desired or required optical absorber thickness, may be advantageous compared to using a single-layer optical absorber 114 covered by a single-layer passivation layer structure 116. One reason is that sufficient passivation of a thick CNT layer (e.g., with a thickness of a few hundred micrometers) may not be readily achieved with a single passivation layer, since only a limited thickness of the CNT layer would be covered by the passivation layer structure 116. Another reason is that once the CNT layer exceeds a certain thickness, the passivation layer structure 116 may not provide appropriate protection against attacks from the sides. It is appreciated that while the embodiment of FIG. 4 includes three optical absorber layers 114a-114c interleaved with three passivation layers 116a-116c, a different number of these layers may be used in other embodiments, for example between two and twenty. It is also appreciated that depending on the application, the plurality of optical absorber layers 114a-114c may or may not be all identical (e.g., in terms of thickness), and likewise for the plurality of passivation layers 116a-116c.

Figure 5:
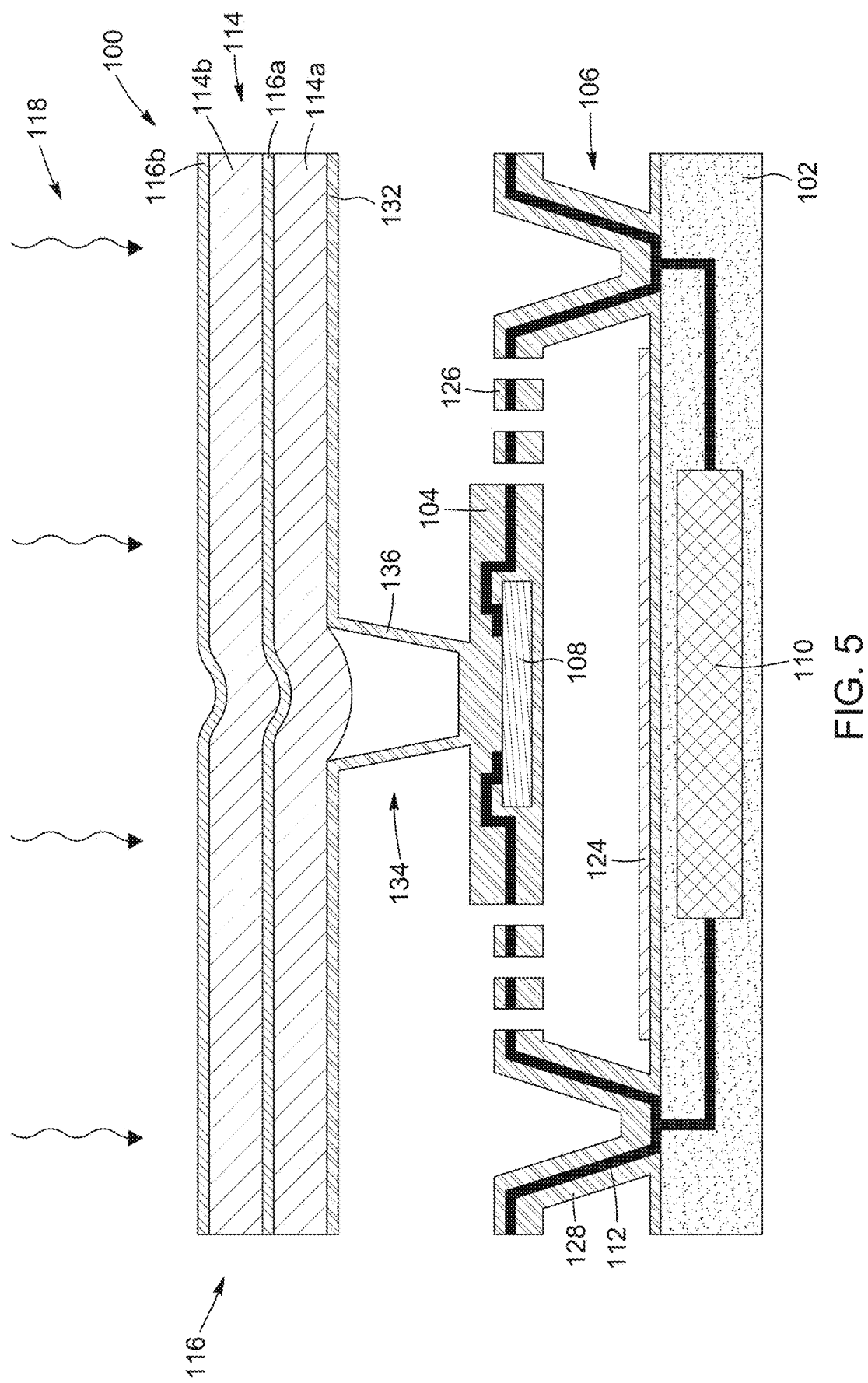
FIG. 5 is a schematic cross-sectional elevation view of a thermal radiation detector in accordance with another embodiment, where the thermal radiation detector is a microbolometer detector having both a double-platform structure and a stack of alternating optical absorber layers and passivation layers.

Referring to FIG. 5, there is illustrated another embodiment of a thermal radiation detector 100, which is again implemented as a microbolometer detector. This embodiment includes both a double-platform structure, as in FIG. 3, and a stacked interleaved configuration for the optical absorber 114 and the passivation layer structure 116, as in FIG. 4.

Figure 6A:
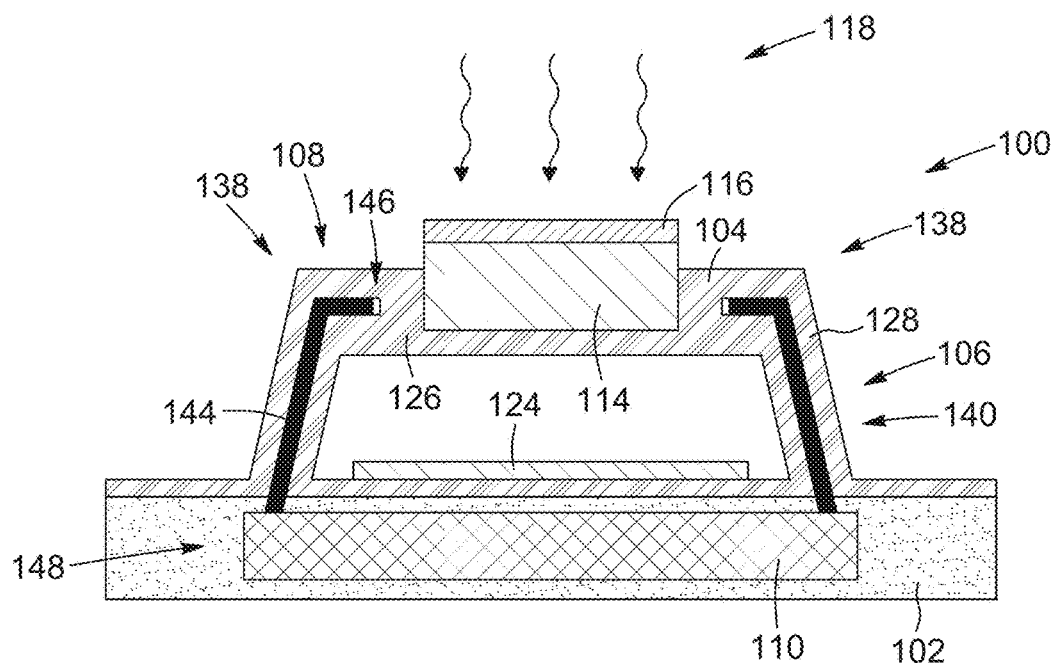
FIG. 6A is a schematic cross-sectional elevation view of a thermal radiation detector in accordance with another embodiment, where the thermal radiation detector is a thermopile detector.
Figure 6B:
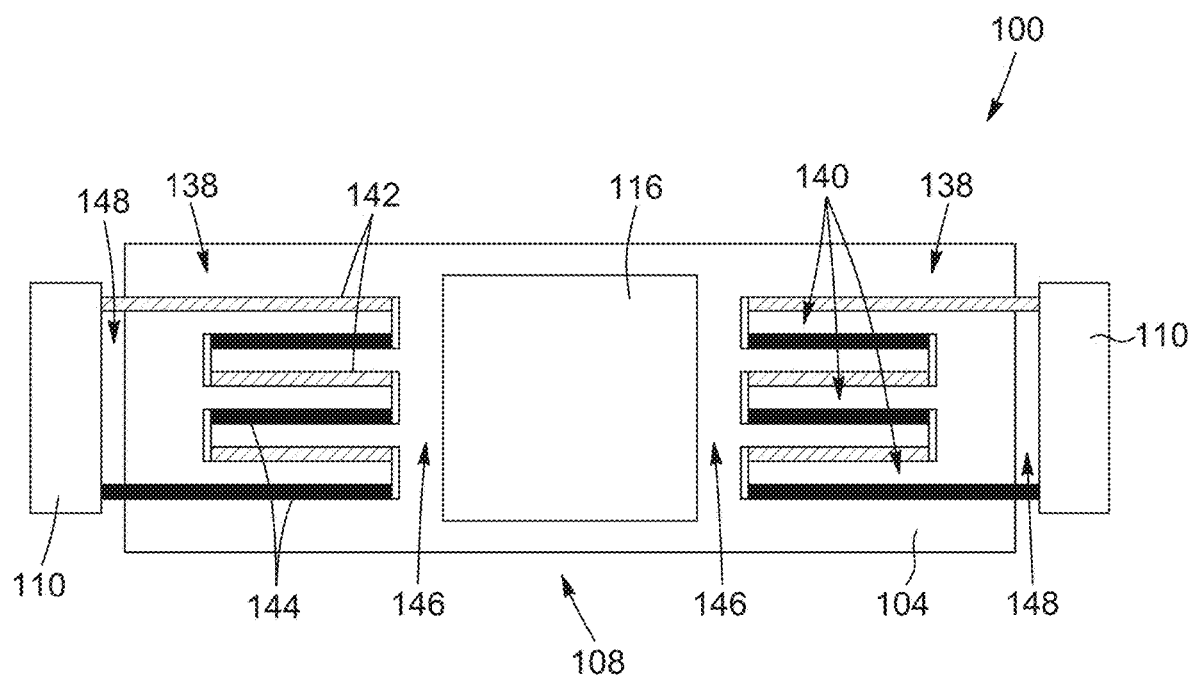
FIG. 6B is a schematic top view of the thermal radiation detector of FIG. 6A, in which components have been omitted to illustrate the configuration of the thermopiles.

Referring to FIGS. 6A and 6B, there is illustrated another embodiment of a thermal radiation detector 100, which is implemented as a thermopile detector. The operation of thermopile detectors is based on the Seebeck effect, which is the generation of an electromotive force, also referred to as the Seebeck voltage, in response to a temperature difference between a hot and a cold junction of two dissimilar materials forming a thermocouple. In a thermopile detector, a plurality of thermocouples connected usually in series is provided to increase the magnitude of the voltage output.

The embodiment of FIGS. 6A and 6B shares several features with the embodiments of FIGS. 1 to 5, which will not be described again other than to highlight differences between them. The thermal radiation detector 100 generally includes a substrate 102, a platform 104, a support structure 106, a temperature sensor 108, an electrical readout circuit 110, an optical absorber 114, and a passivation layer structure 116, which may be similar to those of FIGS. 1 to 5. The temperature sensor 108 includes one or more thermopiles 138, each thermopile 138 including an array of thermocouples 140. Referring more particularly to FIG. 6B, the temperature sensor 108 includes two thermopiles 138, each of which including three thermocouples 140. It appreciated that these numbers can be varied in other embodiments. Each thermocouple 140 in FIG. 6B includes a first thermocouple layer 142 made of a first thermocouple material and a second thermocouple layer 144 made of a second thermocouple material different from the first thermocouple material. Each thermopile 138 defines a closed hot end 146 located on the platform 104, near and in thermal contact with the optical absorber 114, and an open cold end 148 located in the substrate 102 and connected to the electrical readout circuit 110.

When the optical absorber 114 is exposed to the electromagnetic radiation 118, heat is generated which increases the temperature of the hot end 146 of each thermopile, thus creating a temperature gradient between the hot end 146 and the cold end 148. The temperature gradient gives rise to a Seebeck voltage which can be measured by the electrical readout circuit 110 connected at the cold end 148 of each thermopile. The thermocouple materials may be formed of any suitable electrically conducting materials, including metals, alloys, and semiconductors. Non-limiting examples of possible thermocouple materials include, to name a few, aluminum, chromium, gold, copper, platinum, nickel, bismuth, antimony, p-type silicon, and n-type silicon, and various other semiconducting materials.

Figure 7:
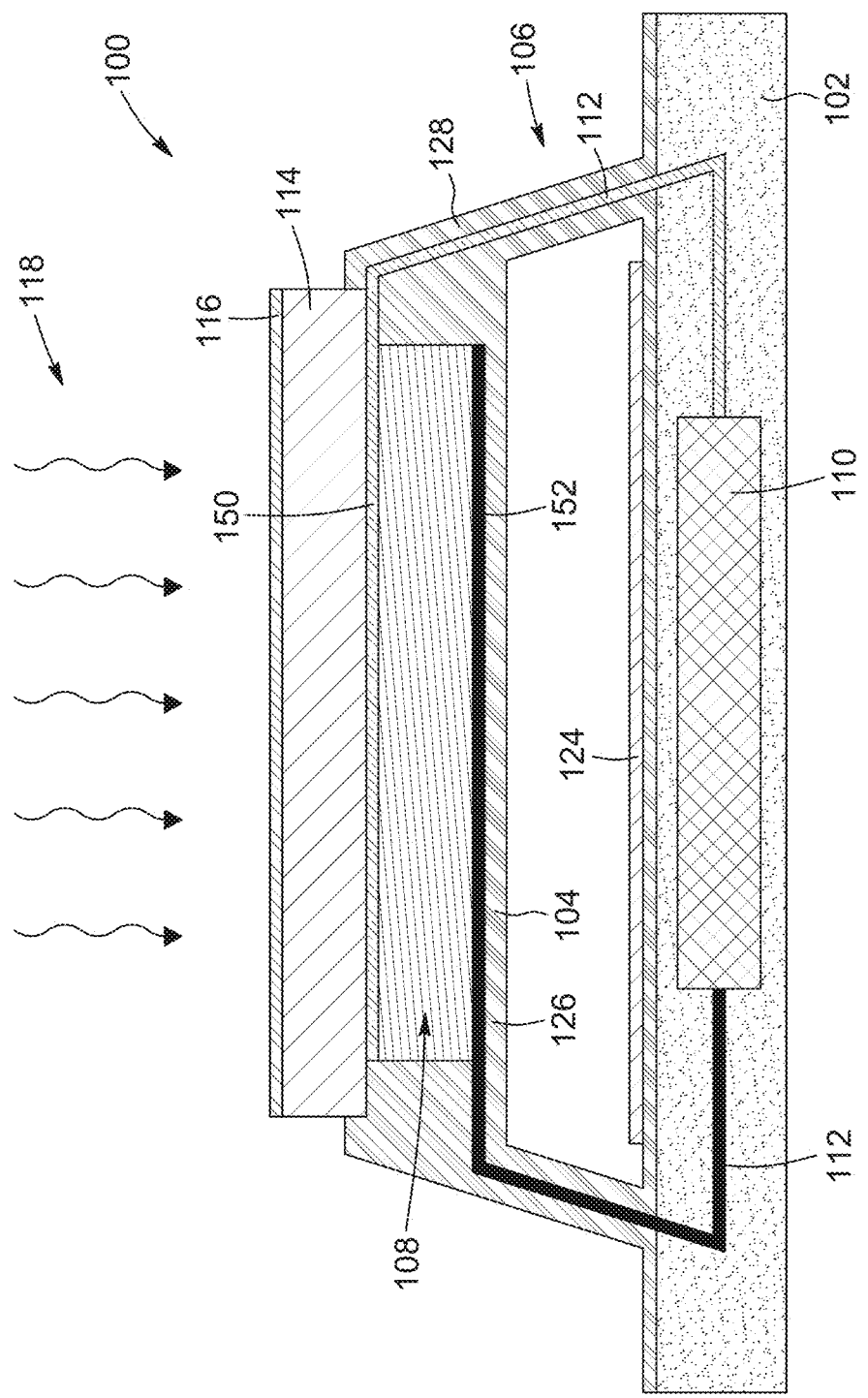
FIG. 7 is a schematic cross-sectional elevation view of a thermal radiation detector in accordance with another embodiment, where the thermal radiation detector is a pyroelectric detector.

Referring to FIG. 7, there is illustrated another embodiment of a thermal radiation detector 100, which is implemented as a pyroelectric detector. The operation of pyroelectric detectors is based on the pyroelectric effect, which is the change in spontaneous polarization with temperature observed in certain non-centrosymmetric crystals, referred to as pyroelectric materials. This change in spontaneous polarization produces a pyroelectric signal, typically a voltage or a current, which is proportional to the temperature change and can be measured to convey information about the absorbed radiation.

The embodiment of FIG. 7 shares several features with the embodiments of FIGS. 1 to 5, which will not be described again other than to highlight differences between them. The thermal radiation detector 100 generally includes a substrate 102, a platform 104, a support structure 106, a temperature sensor 108, an electrical readout circuit 110, an electrode structure 112, an optical absorber 114, and a passivation layer structure 116, which may be similar to those of FIGS. 1 to 5. In FIG. 7, the temperature sensor 108 includes a pyroelectric element, for example, a pyroelectric layer interposed between a top electrode 150 and a bottom electrode 152 of the electrode structure 112 to form a capacitor-like structure.

When the optical absorber 114 is exposed to the electromagnetic radiation 118, it generates heat which is transferred through the top electrode 150 into the pyroelectric element. The resulting change in temperature causes a change in the spontaneous polarization of the pyroelectric element, which gives rise to a pyroelectric signal to be measured by the electrical readout circuit 110 via the electrode structure 112. The pyroelectric element may be embodied by any suitable material, structure, or device having a spontaneous polarization that changes with temperature. Non-limiting examples of possible pyroelectric materials include, to name a few, triglycine sulfate (TGS), deuterated TGS (DTGS), lead scandium tantalate (PST), barium strontium titanate (BST), lead lanthanum zirconate titanate (PLZT), Li2SO4, LiNbO3, and LiTaO3.

Figure 8:
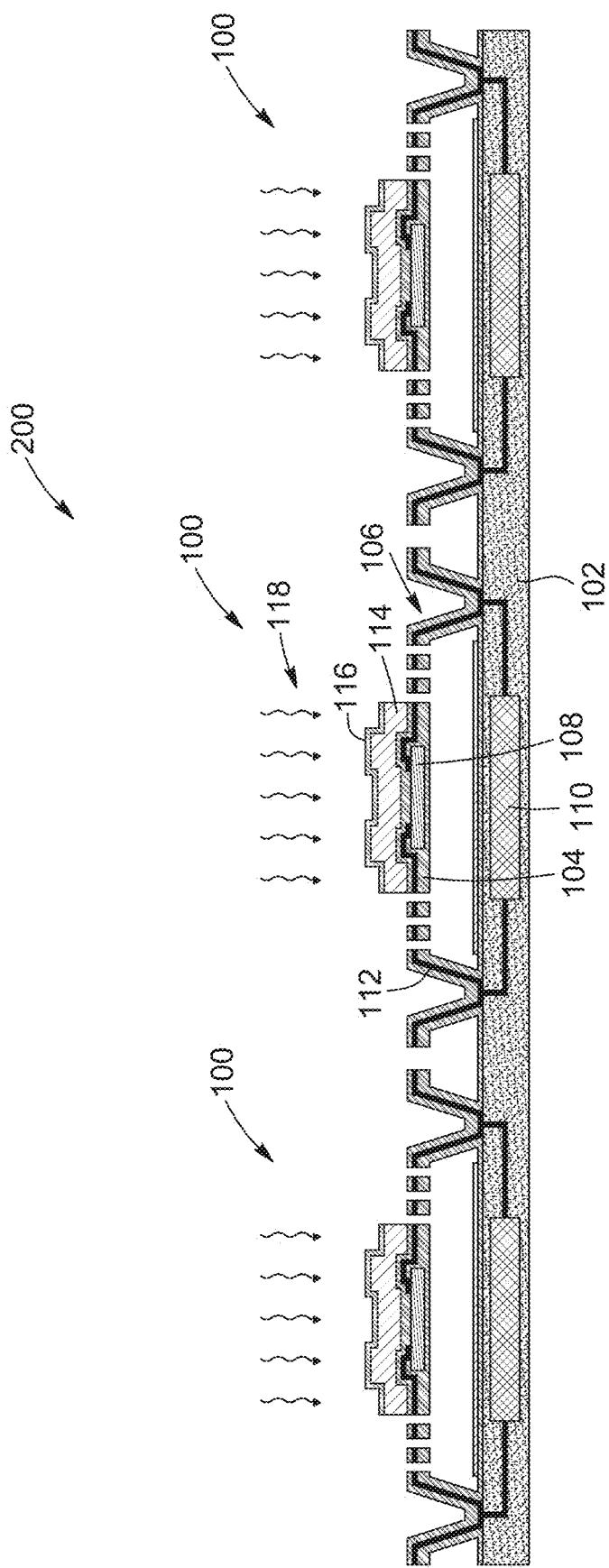
FIG. 8 is a schematic cross-sectional elevation view of an array of thermal radiation detectors, in accordance with an embodiment, where the thermal radiation detectors are microbolometer detectors.
Figure 9:
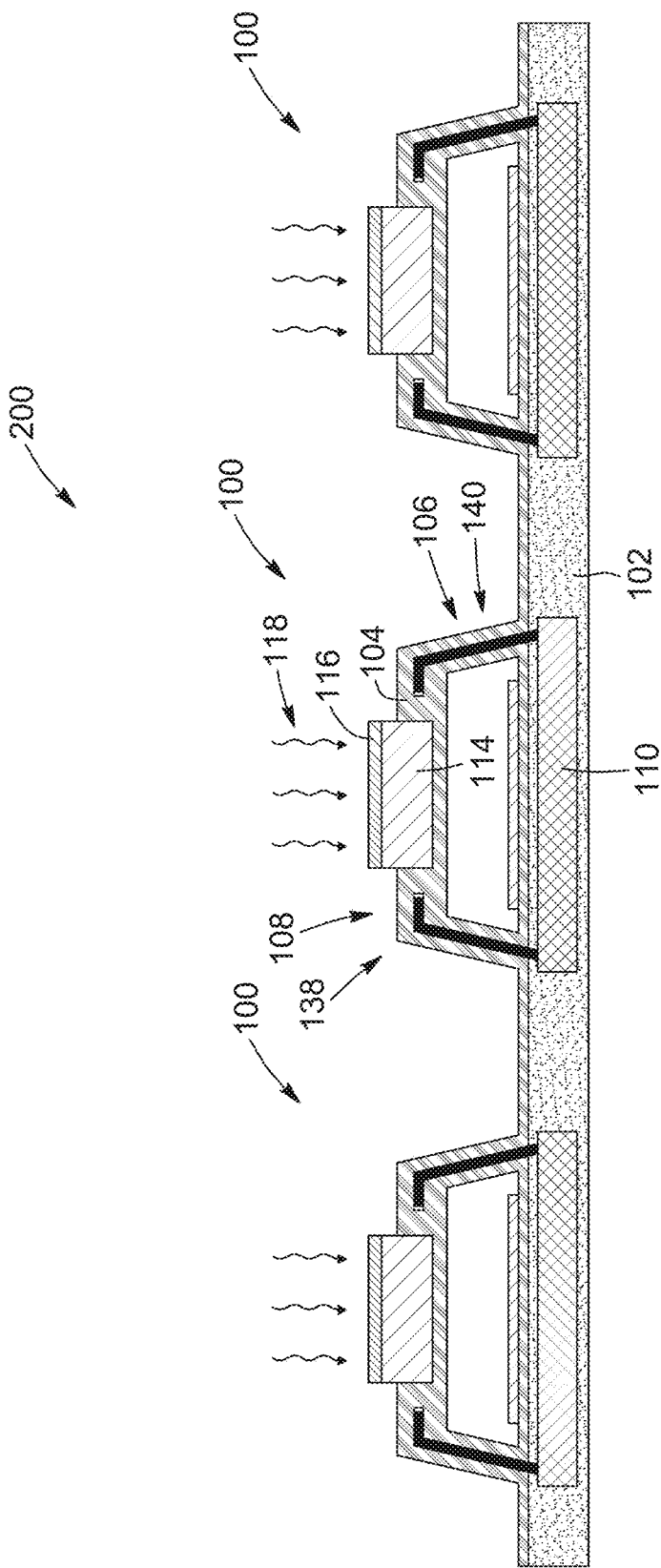
FIG. 9 is a schematic cross-sectional elevation view of an array of thermal radiation detectors, in accordance with an embodiment, where the thermal radiation detectors are thermopile detectors.
Figure 10:
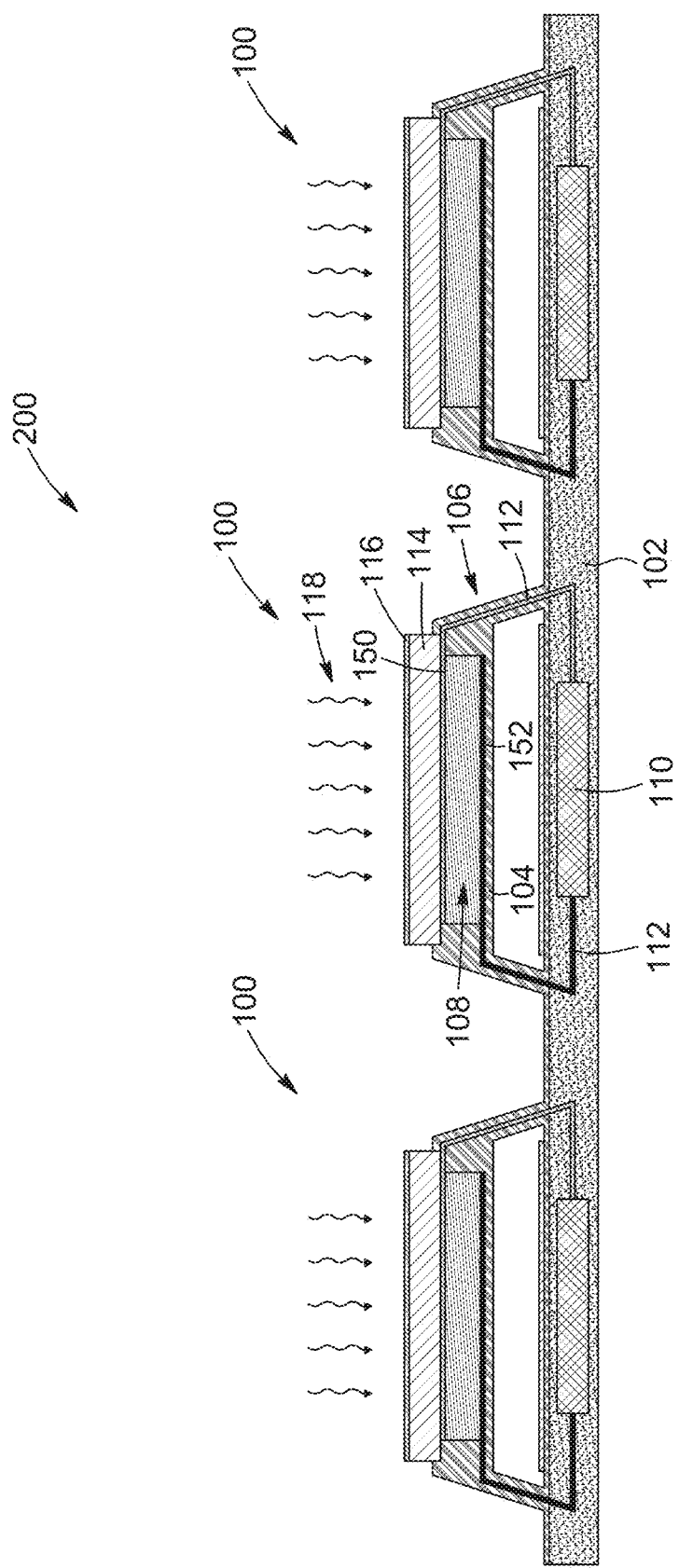
FIG. 10 is a schematic cross-sectional elevation view of an array of thermal radiation detectors, in accordance with an embodiment, where the thermal radiation detectors are pyroelectric detectors.

Referring to FIG. 8, there is illustrated a schematic representation of a thermal radiation detector array 200 that includes a plurality of thermal radiation detectors or pixels 100, such as described above, which are arranged in a two-dimensional matrix of rows and columns. In the illustrated embodiment, the plurality of thermal radiation detectors 100 are implemented as microbolometer detectors. However, other embodiments may use other types of thermal radiation detectors instead of or in addition to microbolometer detectors, such as thermopile/thermocouple detectors, pyroelectric detectors, and any combination thereof. For example, FIG. 9 depicts another embodiment of a thermal radiation detector array 200, where the thermal radiation detectors 100 are thermopile detectors, while FIG. 10 depicts a further embodiment of a thermal radiation detector array 200, where the thermal radiation detectors 100 are pyroelectric detectors.

Returning to FIG. 8, in some implementations, the thermal radiation detector array 200 may be integrated into an uncooled focal plane array (FPA) imaging camera. FIG. 8 depicts the thermal radiation detector array 200 as including only three thermal radiation detectors 100 for clarity. However, in practice, the number of thermal radiation detectors 100 in the array 200 will generally be larger. For example, in some implementations, the thermal radiation detector array 200 may include from about 32×24 to about 2048× 1536 pixels, with a pixel pitch ranging from about 7 µm to about 448 µm. Depending on the application, the thermal radiation detectors 100 may be arranged into a regular linear or two-dimensional array or be provided at arbitrary locations that do not conform to any specific pattern. Depending on the application, the thermal radiation detectors 100 of the array 200 may or may not be all identical.

In some implementations, the thermal radiation detector array 200 may be manufactured by a low-cost and effective method, for example, a wafer-level fabrication process. Such a process may include a series of thin-film deposition steps followed by photolithography and etching to define the pixels array structure.

FABRICATION EXAMPLES

The following description reports work conducted to study and investigate various aspects of the present techniques. It is appreciated that the thermal radiation detectors and the associated manufacturing methods described herein may have a number of optional features, variations, and applications. In particular, the following description is provided to further illustrate some aspects of the disclosed principles, but should not be construed as in any way limiting their scope.

CNT films for use as broadband optical absorbers in focal plane arrays of thermal radiation detectors, for example, microbolometer detectors, were prepared by spray coating.

As noted above, various other methods may be used to prepare CNT films. The spray coating process used involved spraying nano- or picoliter droplets of a CNT dispersion onto a heated substrate. Heating the substrate can accelerate the evaporation of the solvent and speed up the coating process. For example, the substrate temperature may be varied from room temperature up to about 300° C., depending on the composition of the substrate and the materials used to fabricate the thermal radiation detectors. The sprayed droplets underwent pyrolytic decomposition and formed a uniform thin-film layer of randomly arranged CNTs. The dispersion solvents and byproducts evaporated in ambient air. The spray coating process used was found to be suitable for coating large-area substrates with continuous or discontinuous (e.g., patterned) CNT films of various thicknesses, for example, ranging from about 50 nm to about 500 µm. A variety of substrates may be used for spray coating CNT films including, to name a few, glass, quartz, silicon, and various types of plastic substrates, such as polyethylene, polyimide, and polycarbonate. This versatility makes the spray coating process used a valuable method for fabricating a wide range of devices, notably for large-area coating applications. Surfactants such as sodium dodecyl sulfate (SDS) and sodium dodecyl benzene sulfonate (SDBS) are often used to form uniform aqueous CNT dispersions for spray coating. Another approach to forming CNT dispersions is to use organic solvents, such as, for example, anhydrous ethanol, n-methyl-pyrrolidone (NMP), dimethyl-formamide (DMF), and toluene.

Figure 11:
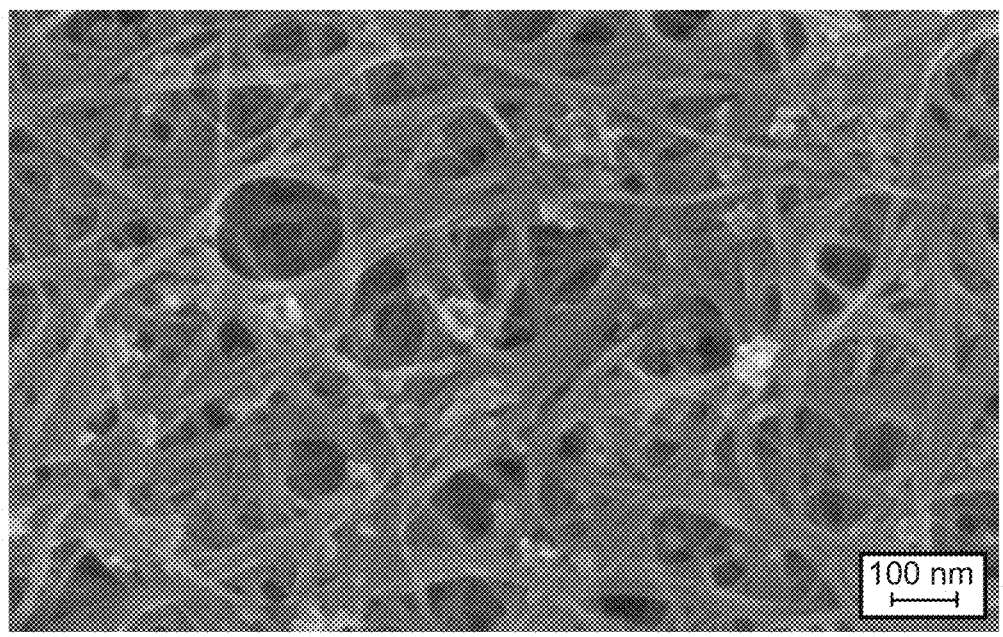
FIG. 11 is a scanning electron microscope image of a film of randomly aligned CNTs prepared by ultrasonic spray coating with n-methyl-pyrrolidone as a solvent, in accordance with another embodiment.

Referring to FIG. 11, there is illustrated a scanning electron microscope image of a film of randomly arranged CNTs prepared by ultrasonic spray coating with n-methyl-pyrrolidone as a solvent, in accordance with the present techniques. The image shows a highly porous CNT film, which may be advantageous for achieving a high absorption coefficient.

Figure 12:
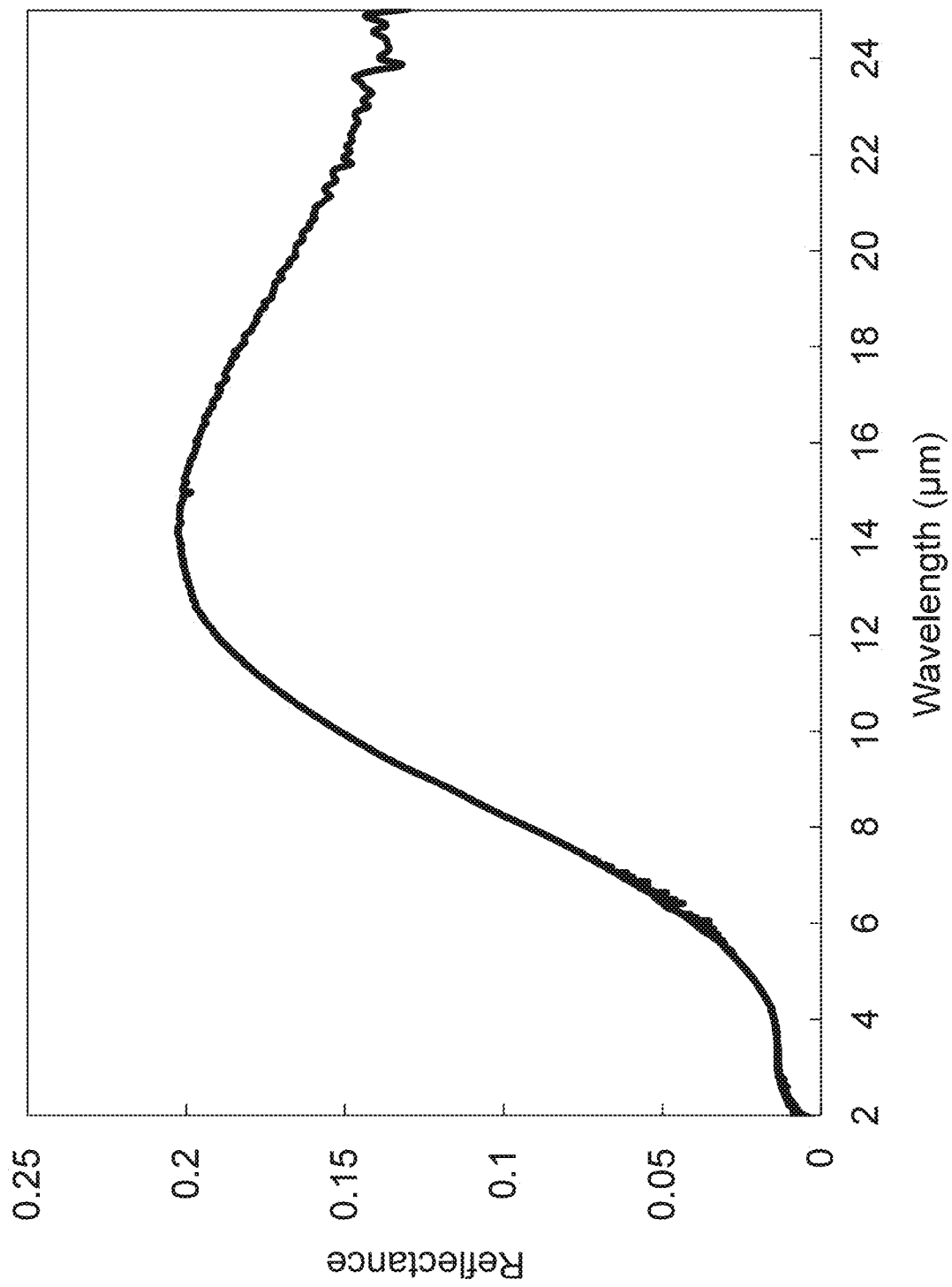
FIG. 12 shows a Fourier transform infrared (FTIR) reflectance spectrum of a CNT film with a random arrangement of CNTs and having a thickness of about 2 micrometers (μm) in accordance with another embodiment, where the CNT film was formed by spray coating.
Figure 13:
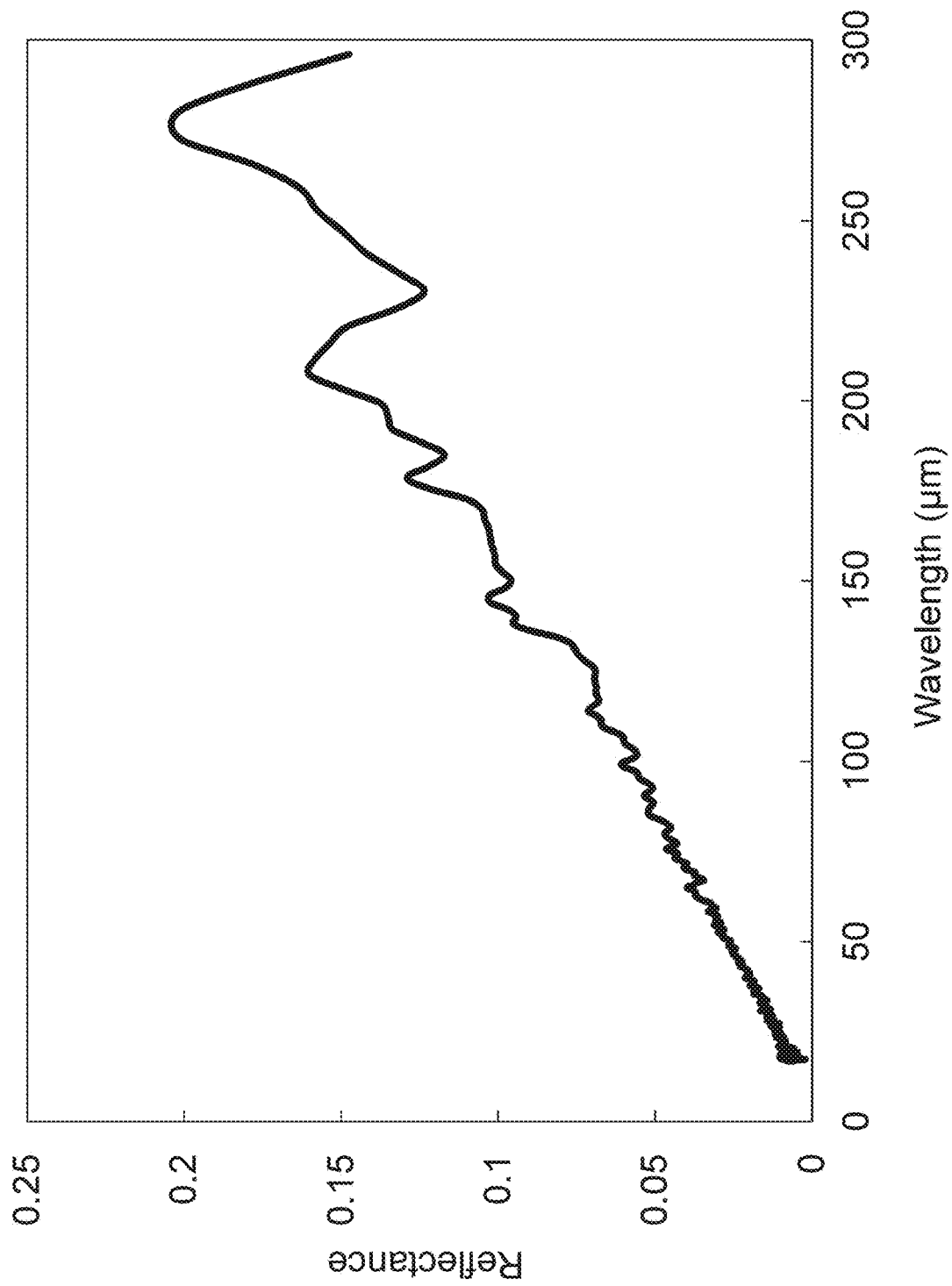
FIG. 13 shows an FTIR reflectance spectrum of a CNT film with a random arrangement of CNTs and having a thickness of about 300 μm, in accordance with another embodiment, where the CNT film was formed by a film transfer technique.

FTIR spectroscopy measurements were carried out. FIG. 12 shows an FTIR reflectance spectrum of a CNT film with randomly arranged CNTs and having a thickness of about 2 µm. The CNT was obtained by spray coating. FIG. 12 indicates that the absorption coefficient of the film exceeds 0.8 over a wavelength range from about 2 µm to about 25 µm. FIG. 13 shows an FTIR reflectance spectrum of another CNT film, having this time a thickness of 300 µm, and which was formed on a silicon substrate using a film transfer technique. The absorption coefficient of the film remains greater than about 0.8 up to a wavelength of about 300 µm. The results depicted in FIGS. 12 and 13 demonstrate that thicker CNT films may have absorption spectra that extend to longer wavelengths, for example, in the far-infrared, terahertz, and millimeter regions.

Figure 14:
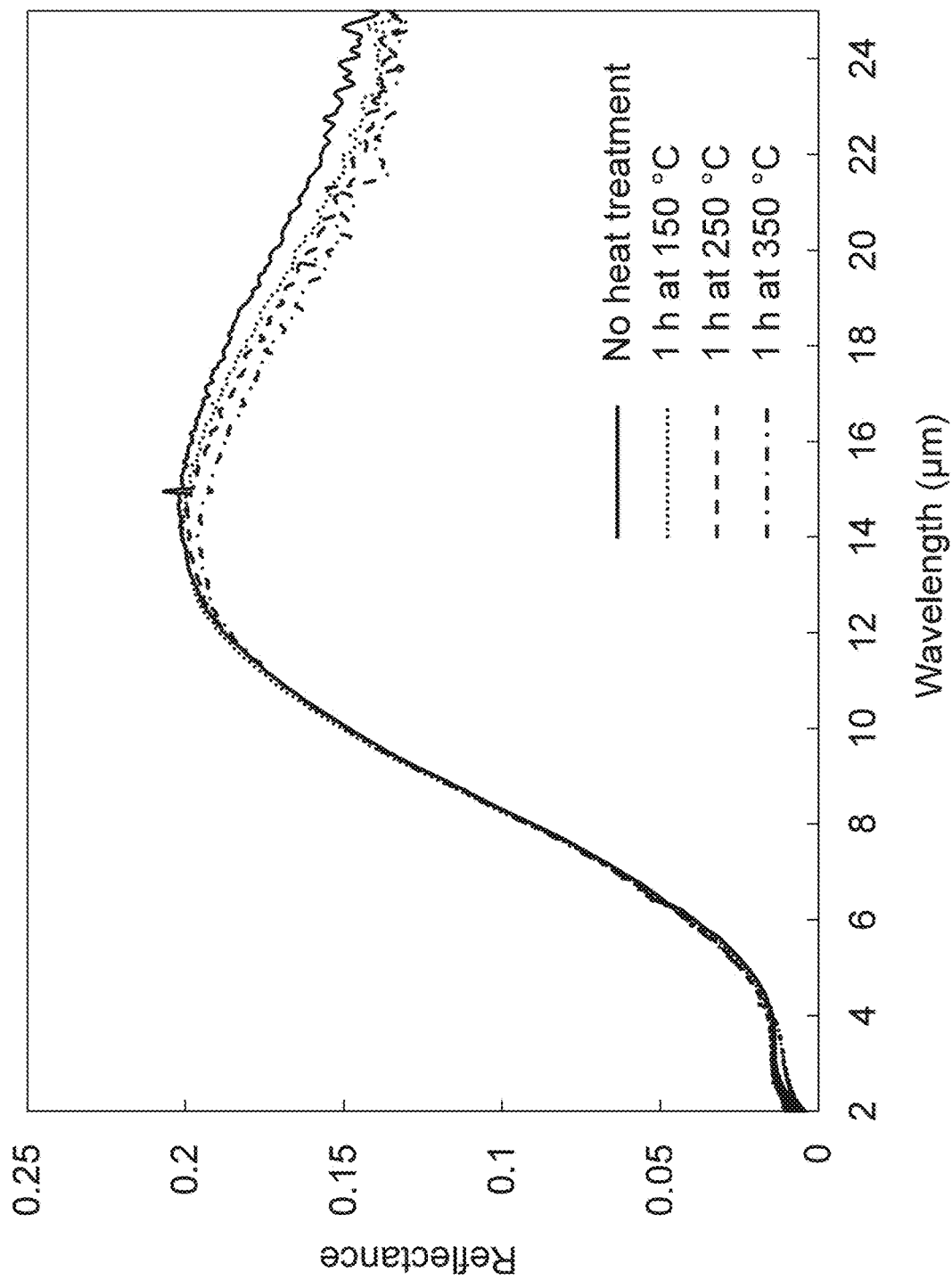
FIG. 14 shows four FTIR reflectance spectra of a CNT film having a random arrangement of CNTs and a thickness of about 2 μm. The CNT film was formed by spray coating. One of the spectra was obtained without subjecting the CNT film to a heat treatment. The other three spectra were obtained after having successively cured the CNT film for an hour at 150° C., 250° C., and 350° C., respectively.

In addition to their broadband absorption spectra, another sought-after property of CNT films is their ability to withstand high processing temperatures. FIG. 14 presents the results of thermal stability measurements that were performed on a thin film of CNTs obtained by spray coating. More particularly, FIG. 14 shows four FTIR reflectance spectra of a CNT film having a random arrangement of CNTs and a thickness of about 2 µm. The CNT film was formed by spray coating. One of the spectra was obtained without subjecting the CNT film to a heat treatment, while the other spectra were obtained after successively curing the CNT film for an hour at 150° C., 250° C., and 350° C., respectively. The results show that the absorption spectra of the CNT film underwent essentially no degradation as of result of thermal treatment, even after being heated up to 350° C. for an hour. These results indicate that CNT films may be used as optical absorbers in thermal radiation detectors and arrays of such detectors whose manufacturing and/or packaging processes involve high processing temperatures.

Figure 15:
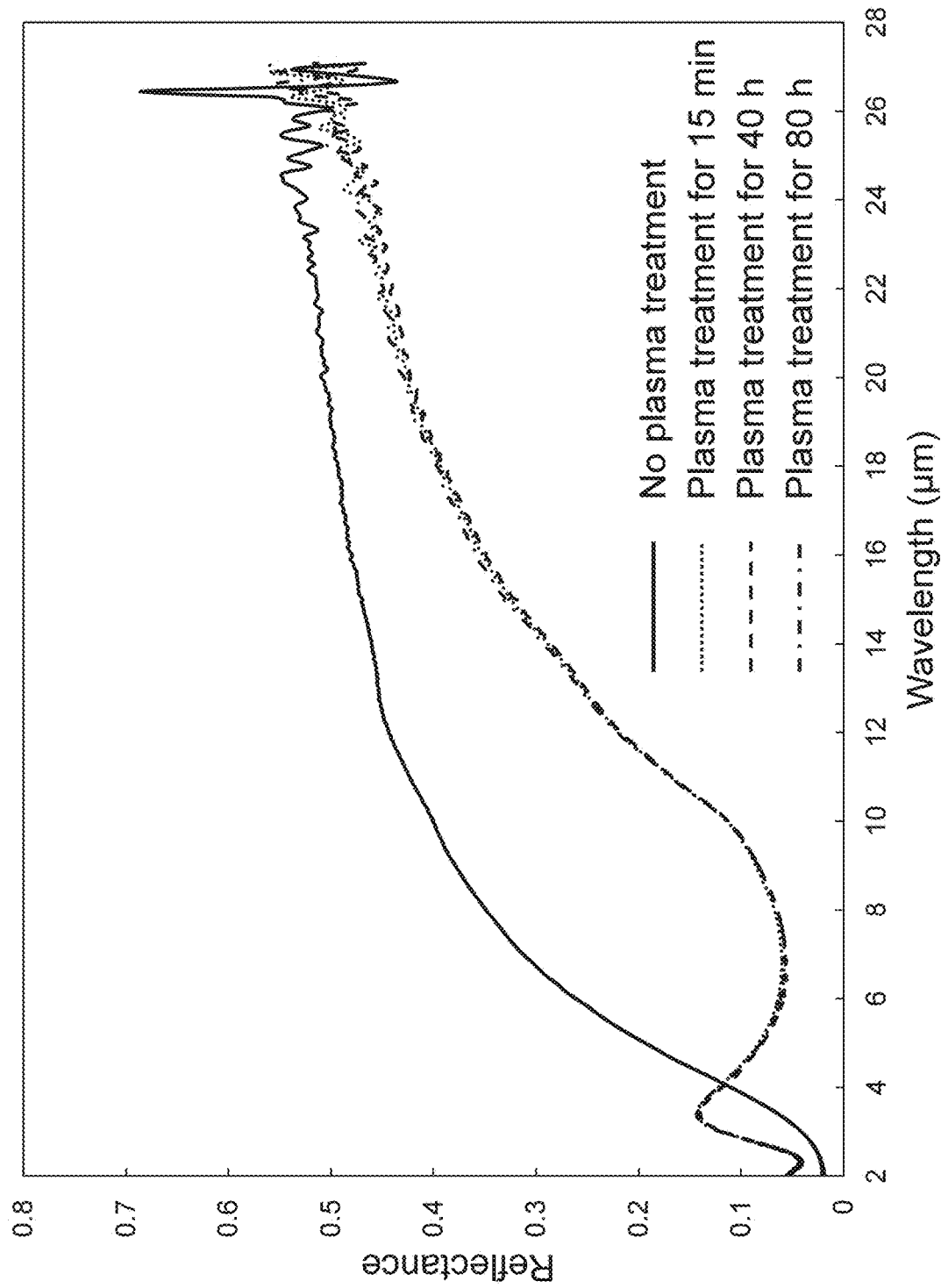
FIG. 15 shows four FTIR reflectance spectra of a CNT film. One of the spectra was obtained after sputter deposition of a titanium layer on the CNT film. The other spectra were obtained after successively subjecting the titanium-coated CNT film to oxygen plasma in a plasma asher system for 15 minutes, 40 hours, and 80 hours, respectively.

Passivation titanium layers were deposited on CNT films by ion beam sputtering from a titanium target. The thickness of the titanium layers ranged from about 50 nm to about 200 nm. The titanium layers were converted to titanium oxide (TixOy) layers after having been subjected to a plasma oxidation process in a plasma asher system. The presence of titanium at the surface of CNTs inhibits the reaction between oxygen and carbon and favors the formation of titanium oxide. FIG. 15 shows four FTIR reflectance spectra of a CNT film. One of the spectra was obtained after sputter deposition on the CNT film of a titanium layer having a thickness of about 100 nm. The other spectra were obtained after oxidation of the titanium-coated CNT film in an oxygen plasma for 15 minutes, 40 hours, and 80 hours, respectively. The results in FIG. 15 show that the absorption coefficient of the CNT film improved following the transition from titanium to titanium oxide, which had already occurred after 15 minutes of plasma oxidation. The transition of titanium to titanium oxide increased the transmittance of the passivation layer and, as a result, the amount of radiation absorbed by the underlying CNT film. FIG. 15 also shows that once the transition had occurred, the absorption spectrum of the passivated CNT film suffered no noticeable degradation related to the duration of the plasma oxidation process. Notably, the absorption coefficient of the passivated CNT film became greater than about 0.8 over a wavelength range from about 2 µm to about 12 µm after 15 minutes into the plasma oxidation process, and remained so even after 80 hours of treatment. Further improvement or tailoring of the absorption coefficient of passivated CNT films may be achieved through control of the thickness and other properties of either or both of the CNT film and passivation layer.

Figure 16:
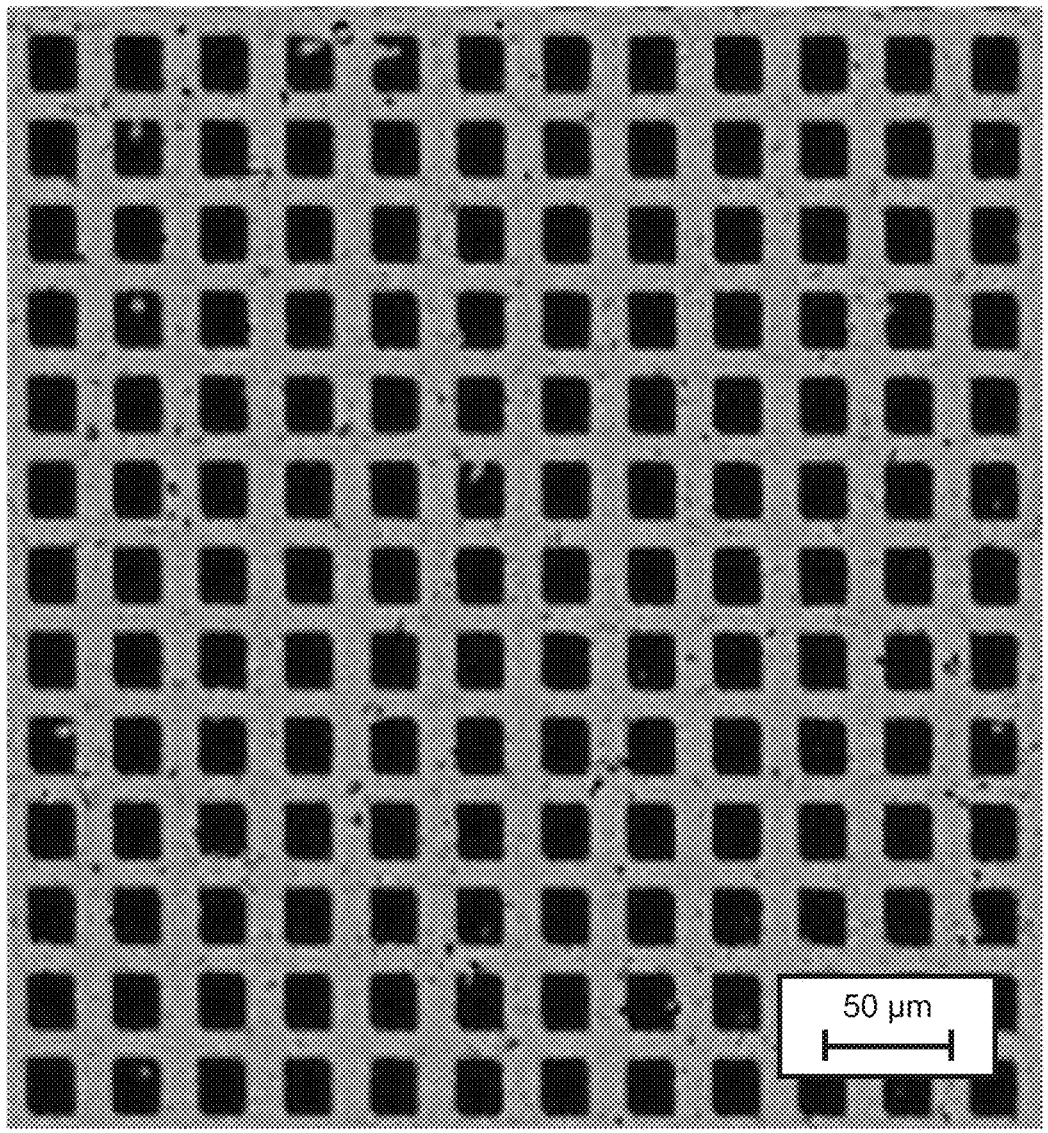
FIG. 16 is an optical microscope image of an array of passivated CNT-based optical absorbers formed on a six-inch silicon wafer substrate and patterned by a photolithography and etching process.

Referring to FIG. 16, there is illustrated an optical microscope image of a patterned array of passivated CNT-based optical absorbers formed on a six-inch silicon wafer substrate using the techniques disclosed herein. A CNT film was deposited on the substrate by ultrasonic spray coating and was subsequently passivated by sputter deposition of a titanium layer and conversion of the titanium layer into a titanium oxide layer via plasma oxidation treatment. The passivated CNT film was subsequently patterned using photolithography and dry and wet etching techniques to form an array of passivated CNT-based optical absorbers. The titanium oxide passivation layer protected the integrity of the CNT film during the etching process. The nominal horizontal dimensions of each individual optical absorber depicted in FIG. 16 are about 19 µm by about 23 µm.

Numerous modifications could be made to the embodiments described above without departing from the scope of the appended claims.

What is claimed is:

1. A thermal radiation detector comprising:
   a substrate;
   a platform suspended above the substrate;
   a support structure holding the platform;
   a temperature sensor disposed on the platform and having an electrical parameter that varies in accordance with a temperature of the temperature sensor;
   an optical absorber in thermal contact with the temperature sensor and configured to absorb incoming electromagnetic radiation to generate heat to change the temperature of the temperature sensor, the optical absorber comprising carbon nanotubes; and a passivation layer structure disposed over the optical absorber, wherein the passivation layer structure is made of a passivation material comprising a metal compound.

2. The thermal radiation detector of claim 1, wherein the temperature sensor comprises a thermistor.

3. The thermal radiation detector of claim 1, wherein the temperature sensor comprises at least one thermocouple.

4. The thermal radiation detector of claim 1, wherein the temperature sensor comprises a pyroelectric material.

5. The thermal radiation detector of claim 1, wherein the metal compound comprises a metal oxide, a metal nitride, a metal carbide, a metal boride, or any combination thereof.

6. The thermal radiation detector of claim 1, wherein the metal compound comprises titanium oxide or aluminum oxide.

7. The thermal radiation detector of claim 1, wherein the passivation layer structure is substantially transparent to electromagnetic radiation having a wavelength ranging from about 0.2 micrometer to about 30 micrometers.

8. The thermal radiation detector of claim 1, wherein the passivation layer structure is formed by a sputtering deposition process followed by an oxidation process.

9. The thermal radiation detector of claim 1, wherein the carbon nanotubes are deposited by a spray coating process.

10. The thermal radiation detector of claim 1, wherein the carbon nanotubes form a random arrangement of single walled carbon nanotubes, multiwalled carbon nanotubes, or a mixture of single and multiwalled carbon nanotubes.

11. The thermal radiation detector of claim 1, wherein the optical absorber comprises a plurality of optical absorber layers and the passivation layer structure comprises a plurality of passivation layers, each of which being disposed over a respective optical absorber layer of the plurality of optical absorber layers in a stacked and interleaved arrangement.

12. The thermal radiation detector of claim 1, wherein the optical absorber is disposed on the platform and over the temperature sensor.

13. The thermal radiation detector of claim 1, further comprising an absorber platform suspended above the platform and another support structure holding the absorber platform, the optical absorber being disposed on the absorber platform.

14. A thermal radiation detector array comprising a plurality of thermal radiation detectors in accordance with claim 1.

15. A microbolometer detector comprising:
a substrate;
a platform suspended above the substrate;
a support structure holding the platform;
a thermistor disposed on the platform and having an electrical resistance that varies with a temperature of the thermistor;
an optical absorber in thermal contact with the thermistor and configured to absorb incoming electromagnetic radiation to generate heat to change the temperature of the thermistor; and
a passivation layer structure disposed over the optical absorber and comprising titanium oxide.

16. A method of fabricating a thermal radiation detector, comprising:
forming a sacrificial layer on a substrate;
forming a platform and a support structure on the sacrificial layer;
forming a temperature sensor on the platform, the temperature sensor having an electrical parameter that varies in accordance with a temperature of the temperature sensor;
forming an optical absorber in thermal contact with the temperature sensor and configured for absorbing incoming electromagnetic radiation to generate heat to change the temperature of the temperature sensor, the optical absorber comprising carbon nanotubes;
forming a passivation layer structure over the optical absorber, wherein the passivation layer structure is made of a passivation material comprising a metal compound; and
removing the sacrificial layer to suspend the platform above the substrate by the support structure and release the thermal radiation detector.

17. The method of claim 16, wherein forming the optical absorber comprises depositing the carbon nanotubes by a spray coating process.

18. The method of claim 16, wherein forming the passivation layer structure comprises depositing a titanium layer on the optical absorber and performing an oxidation process to oxidize the titanium layer into a titanium oxide layer.

19. The method of claim 16, wherein forming the passivation layer structure comprises depositing a titanium oxide layer on the optical absorber.

* * * * *